(12) United States Patent
Matsuda et al.

(10) Patent No.: US 11,706,072 B2
(45) Date of Patent: Jul. 18, 2023

(54) APPARATUS AND METHOD FOR FILTERING A BIT STREAM AND PROVIDING GUARD BANDS

(71) Applicant: Sony Group Corporation, Tokyo (JP)

(72) Inventors: Hiroki Matsuda, Tokyo (JP); Ryota Kimura, Tokyo (JP); Kazuyuki Shimezawa, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/478,971

(22) Filed: Sep. 20, 2021

(65) Prior Publication Data

US 2022/0006598 A1     Jan. 6, 2022

Related U.S. Application Data

(63) Continuation of application No. 16/067,762, filed as application No. PCT/JP2016/082166 on Oct. 28, 2016, now Pat. No. 11,128,431.

(30) Foreign Application Priority Data

Jan. 26, 2016    (JP) ................................ 2016-012196

(51) Int. Cl.
    *H04W 4/00*       (2018.01)
    *H04L 27/26*      (2006.01)
    *H04L 5/00*        (2006.01)

(52) U.S. Cl.
    CPC ...... *H04L 27/26265* (2021.01); *H04L 5/0092* (2013.01); *H04L 27/2605* (2013.01); *H04L 27/26414* (2021.01)

(58) Field of Classification Search
CPC ............ H04L 27/26265; H04L 5/0092; H04L 27/2605; H04L 27/26414; H04L 27/264
See application file for complete search history.

(56) References Cited

U.S. PATENT DOCUMENTS

| 2002/0118659 A1* | 8/2002 | Sakoda | .................. H04B 7/264 |
| | | | 370/329 |
| 2002/0133335 A1* | 9/2002 | Chen | ...................... G10L 19/10 |
| | | | 704/219 |

(Continued)

FOREIGN PATENT DOCUMENTS

| JP | 2009-267797 A | 11/2009 |
| JP | 2010-199923 A | 9/2010 |

(Continued)

OTHER PUBLICATIONS

International Search Report dated Jan. 17, 2017 in PCT/JP2016/082166 filed Oct. 28, 2016.

(Continued)

*Primary Examiner* — Atique Ahmed
(74) *Attorney, Agent, or Firm* — Xsensus LLP

(57) ABSTRACT

An apparatus including: a communication unit configured to perform radio communication; and a control unit configured to perform control such that control information regarding a resource to which a filter for limiting a width of a guard band in a frequency band to be used in the radio communication is applied is transmitted to an external apparatus through the radio communication. The filter improves frequency use efficiency.

20 Claims, 17 Drawing Sheets

(56) References Cited

U.S. PATENT DOCUMENTS

| | | |
|---|---|---|
| 2004/0257270 A1 | 12/2004 | Poullin |
| 2006/0128329 A1* | 6/2006 | Van Rooyen ........ H04B 1/0082 |
| | | 455/552.1 |
| 2007/0263738 A1 | 11/2007 | Jitsukawa et al. |
| 2010/0074209 A1 | 3/2010 | Montojo et al. |
| 2010/0290544 A1* | 11/2010 | Kawamura ....... H04L 25/03828 |
| | | 455/509 |
| 2011/0211489 A1 | 9/2011 | Chung et al. |
| 2012/0155571 A1* | 6/2012 | Yang .................... H04B 7/0669 |
| | | 375/295 |
| 2012/0263047 A1* | 10/2012 | Love ..................... H04L 1/0025 |
| | | 370/252 |
| 2013/0064282 A1* | 3/2013 | Roh .................. H04L 25/03159 |
| | | 375/234 |
| 2014/0192848 A1 | 7/2014 | Rao et al. |
| 2014/0342738 A1 | 11/2014 | Ishii |
| 2015/0085677 A1 | 3/2015 | Pourahmadi et al. |
| 2015/0085718 A1 | 3/2015 | Chen et al. |
| 2015/0092677 A1* | 4/2015 | Olsen .................... H04L 5/0044 |
| | | 370/329 |
| 2015/0229502 A1* | 8/2015 | Vilaipornsawai ... H04L 27/2607 |
| | | 375/295 |
| 2015/0349996 A1 | 12/2015 | Vilaipornsawai et al. |
| 2015/0351098 A1 | 12/2015 | Schellmann et al. |
| 2016/0006464 A1 | 1/2016 | Stadelmeier et al. |
| 2016/0248616 A1 | 8/2016 | Vilaipornsawai et al. |
| 2016/0269212 A1 | 9/2016 | Vilaipornsawai et al. |
| 2016/0352419 A1* | 12/2016 | Fonseka ................ H04L 1/0052 |
| 2018/0091346 A1* | 3/2018 | Lee ................... H04L 27/26524 |

FOREIGN PATENT DOCUMENTS

| | | |
|---|---|---|
| JP | 2015-46901 A | 3/2015 |
| WO | 2007/111187 A1 | 10/2007 |
| WO | 2014/109948 A1 | 7/2014 |

OTHER PUBLICATIONS

Extended Search Report issued in European Application 16888084.7-1231 dated Jan. 14, 2019.

Luo, J., et al., "Multi-Carrier Waveform Based Flexible Inter-Operator Spectrum Sharing for 5G Systems", 2014 IEEE International Symposium on Dynamic Spectrum Access Networks (DYSPAN), pp. 449-457, (2014).

Lin, H., "Flexible Configured OFDM for 5G Air Interface", IEEE Access, vol. 3, pp. 1861-1870, (2015).

\* cited by examiner

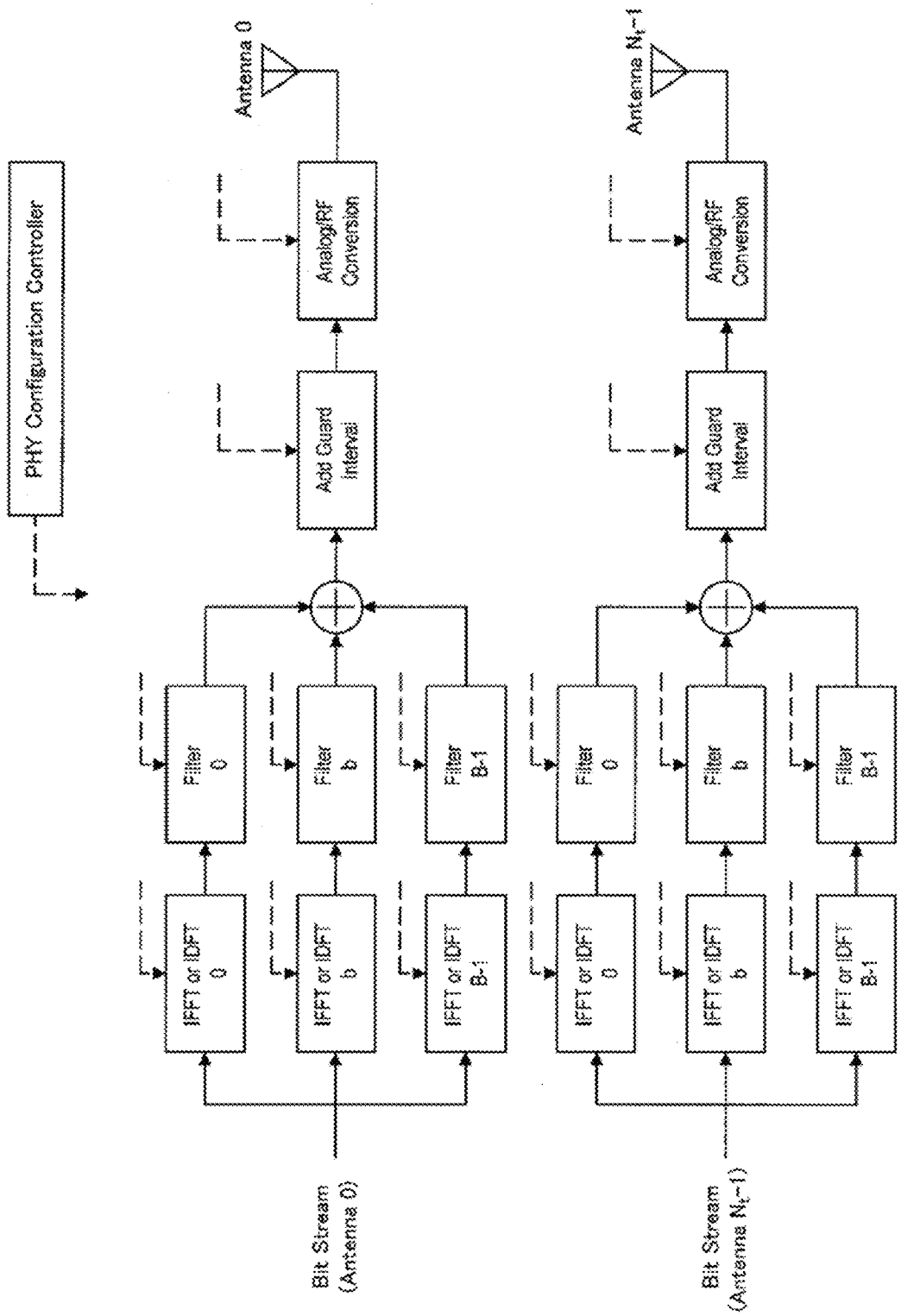

Case 1 : Normal Guard Interval 15kHz Subcarriers

Case 2 : Extended Guard Interval 15kHz Subcarriers

Case 2 : Extended Guard Interval 7.5kHz Subcarriers

APPARATUS AND METHOD FOR FILTERING A BIT STREAM AND PROVIDING GUARD BANDS

CROSS-REFERENCE TO RELATED APPLICATIONS

This application is a continuation of U.S. application Ser. No. 16/067,762, filed Jul. 2, 2018, which is based on PCT filing PCT/JP2016/082166, filed Oct. 28, 2016, and claims priority to Japanese Application No. 2016-012196, filed Jan. 26, 2016, the entire contents of each are incorporated herein by reference.

TECHNICAL FIELD

The present disclosure relates to an apparatus and a method.

BACKGROUND ART

In orthogonal frequency-division multiple access (OFDMA) and single-carrier frequency-division multiple access (SC-FDMA), which are adopted in Long Term Evolution (LTE)/LTE-Advanced (LTE-A), radio resources (e.g., resource blocks) are allocated to users without overlap. There are cases in radio communication systems employing OFDMA or SC-FDMA in which some frequency bands among bands that are not used in data transmission (Out-of-Bands or OOBs) are used as guard bands for reducing power leakage to adjacent systems. For example, Patent Literature 1 discloses an example of a radio communication system in which part of a frequency band is used as a guard band.

In addition, a New Waveform technology has gained attention as one technology that is expected to improve frequency use efficiency among radio access technologies (RATs) for the fifth generation (5G) mobile communication systems following LTE/LTE-A in recent years. The New Waveform technology is a technology of cutting leaking power by applying filters to a transmission signal waveform and thereby improving frequency use efficiency. By applying the New Waveform technology, attenuation of signals of OOBs, more limitations on frequency bands to be used as guard bands, and further improvement in frequency use efficiency are expected.

CITATION LIST

Patent Literature

Patent Literature 1: JP 2015-46901A

DISCLOSURE OF INVENTION

Technical Problem

On the other hand, in a case in which the New Waveform technology is supported, there are desirable cases in which a filter can be applied in a more preferable mode in accordance with a transmission/reception environment or a use case.

Therefore, the present disclosure proposes an apparatus and a method that enable a filter for improving frequency use efficiency to be applied in a more preferable mode.

Solution to Problem

According to the present disclosure, there is provided an apparatus including: a communication unit configured to perform radio communication; and a control unit configured to perform control such that control information regarding a resource to which a filter for limiting a width of a guard band in a frequency band to be used in the radio communication is applied is transmitted to an external apparatus through the radio communication.

In addition, according to the present disclosure, there is provided an apparatus including: a communication unit configured to perform radio communication; and an acquisition unit configured to acquire control information regarding a resource to which a filter for limiting a width of a guard band in a frequency band to be used in the radio communication is applied from an external apparatus through the radio communication.

In addition, according to the present disclosure, there is provided an apparatus including: a communication unit configured to perform radio communication; and a control unit configured to perform control such that, on a basis of control information regarding a resource to which a filter for limiting a width of a guard band in a frequency band to be used in the radio communication is applied, the filter is applied to transmission data and the transmission data to which the filter has been applied is transmitted to an external apparatus through the radio communication.

In addition, according to the present disclosure, there is provided a method including: performing radio communication; and performing control, by a processor, such that control information regarding a resource to which a filter for limiting a width of a guard band in a frequency band to be used in the radio communication is applied is transmitted to an external apparatus through the radio communication.

In addition, according to the present disclosure, there is provided a method including: performing radio communication; and acquiring, by a processor, control information regarding a resource to which a filter for limiting a width of a guard band in a frequency band to be used in the radio communication is applied from an external apparatus through the radio communication.

In addition, according to the present disclosure, there is provided a method including: performing radio communication; and performing control, by a processor, such that, on a basis of control information regarding a resource to which a filter for limiting a width of a guard band in a frequency band to be used in the radio communication is applied, the filter is applied to transmission data and the transmission data to which the filter has been applied is transmitted to an external apparatus through the radio communication.

Advantageous Effects of Invention

According to the present disclosure described above, an apparatus and a method that enable a filter for improving frequency use efficiency to be applied in a more preferable mode are provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8A is an explanatory diagram for explaining an example of a process performed by a transmission apparatus that supports the New Waveform technology.

MODE(S) FOR CARRYING OUT THE INVENTION

Figure 1:
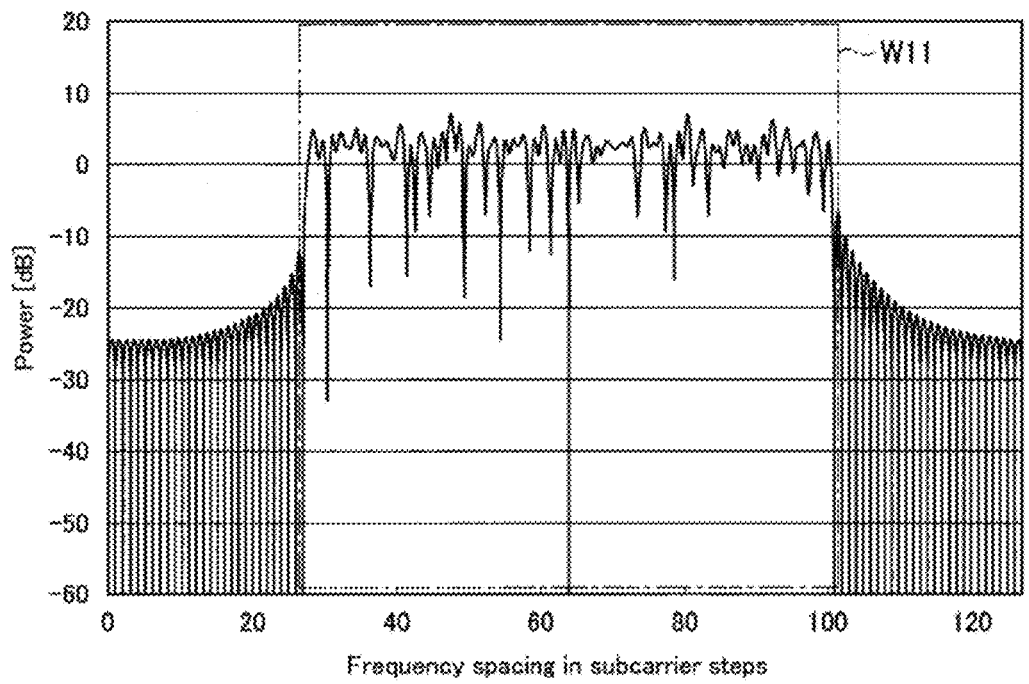
FIG. 1 is an explanatory diagram for explaining an overview of a New Waveform technology.

Hereinafter, (a) preferred embodiment (s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Introduction
1.1. New Waveform technology
1.2. Technical problem
2. Configuration examples
2.1. Configuration example of system
2.2. Configuration example of base station
2.3. Configuration example of terminal apparatus
3. Technical features
4. Application examples
4.1. Application example regarding base station
4.2. Application example regarding terminal apparatus
5. Conclusion

1. INTRODUCTION

<1.1. New Waveform Technology>

Figure 2:
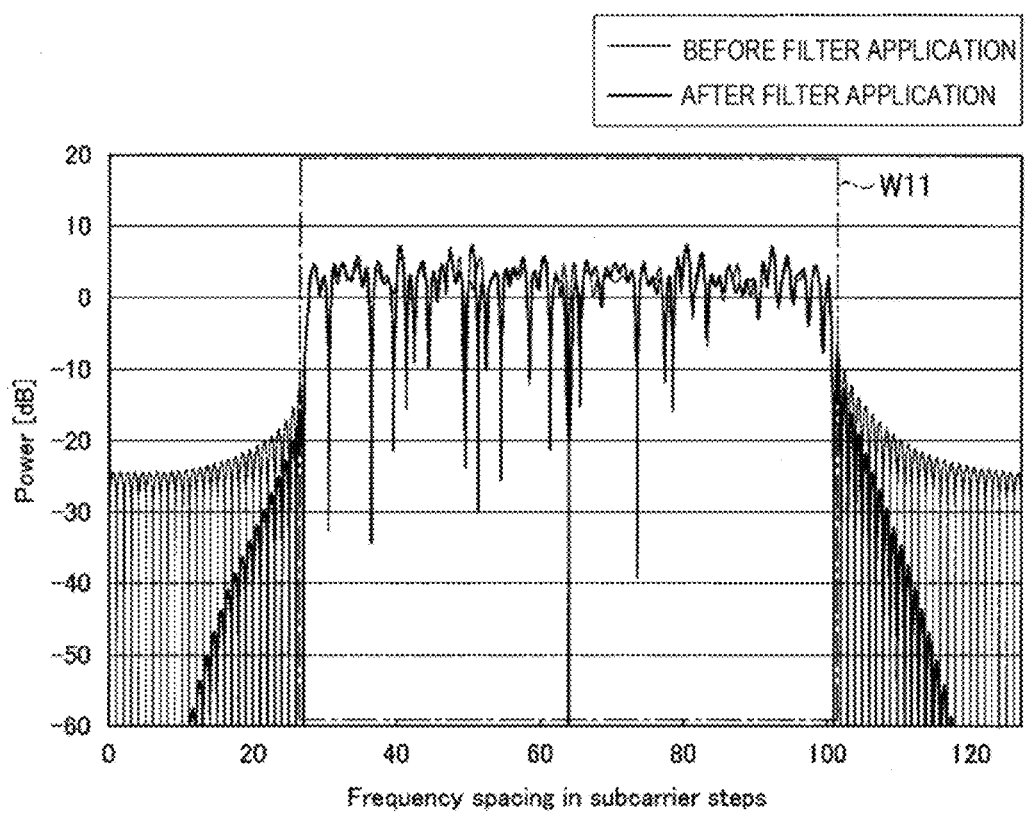
FIG. 2 is an explanatory diagram for explaining an overview of a New Waveform technology.

First, an overview of a New Waveform technology will be described with reference to FIG. 1 and FIG. 2. FIG. 1 and FIG. 2 are explanatory diagrams for explaining an overview of the New Waveform technology.

In orthogonal frequency-division multiple access (OFDMA) and single-carrier frequency-division multiple access (SC-FDMA), which are adopted in Long Term Evolution (LTE) or LTE-Advanced (LTE-A), radio resources (e.g., resource blocks) are allocated to users without overlap. FIG. 1, for example, illustrates an example of a frequency domain power spectrum of transmission signals in a case in which OFDMA is applied. In FIG. 1, the horizontal axis represents frequency bands in a subcarrier and the vertical axis represents levels of transmission power.

In the waveforms of the transmission signal illustrated in FIG. 1, the frequency band indicated by reference numeral W11 represents a frequency band used in data transmission (excluding NULL subcarriers), and frequency bands other than that are Out-of-Bands (OOBs) not used in data transmission. In addition, there are cases in which, among the OOBs, at least some frequency bands are provided as a guard band for reducing power leaking to an adjacent system. In a case in which no guard band is provided, for example, even in a case in which power of about −10 dB is set in a subcarrier with maximum power among the OOBs, power up to approximately −20 dB to −30 dB can be attenuated by providing guard bands.

By providing guard bands at both sides of a frequency band used in data transmission in LTE/LTE-A by using the above-described mechanism, interference due to power leaking to an adjacent system can be reduced.

Meanwhile, there are cases in which the guard bands cause frequency use efficiency to deteriorate because some of the frequency bands are used as unused bands (i.e., the bands are not used in data transmission). As a specific example, in a case in which a channel width is 20 MHz, bands of approximately 2 MHz (1 MHz for one side) are allocated as guard bands, and frequency use efficiency decreases by about 10% in this case.

Thus, the New Waveform technology has gained attention as one technology that is expected to improve frequency use efficiency among radio access technologies (RATs) for the fifth generation (5G) mobile communication systems following LTE/LTE-A. The New Waveform technology is a technology of cutting leaking power by applying a filter to a transmission signal waveform and thereby improving frequency use efficiency. For example, FIG. 2 illustrates an example of a frequency domain power spectrum of the transmission signal illustrated in FIG. 1 in a case in which a Dolph Shebychev filter is applied to the transmission signal. Note that the horizontal axis and the vertical axis of FIG. 2 represent the same as those in the example illustrated in FIG. 1. In addition, in FIG. 2, the waveform of the transmission signal before the application of the filter (i.e., the waveform illustrated in FIG. 1) is also presented.

As indicated by the waveform of the transmission signal after the filter application in FIG. 2, it is ascertained that power decreases in the OOBs due to the filter application. In this manner, by applying the New Waveform technology (i.e., applying the filter to the transmission signal), attenuation of signals of the OOBs, more limitations on the frequency band widths to be used as guard bands, and further improvement in frequency use efficiency are expected.

Note that, if the frequency band widths to be used as the guard bands can be further limited, the type of filter to be applied to the transmission signal is not necessarily limited to the Dolph Chebyshev filter illustrated in FIG. 2. As a specific example, there are cases in which a so-called Nyquist filter such as a root-raised-cosine filter is applied as a filter for realizing the New Waveform technology. In addition, a filter applied to the transmission signal is not necessarily limited to a single filter, and a filter to be applied may be adaptively selected from a plurality of filters. For example, the above-described Dolph Chebyshev filter or root-raised-cosine filter may be selectively applied depending on a situation. Note that, in a case in which it is simply described as a "filter" in the following description, it is assumed to indicate a filter for further limiting frequency band widths to be used as guard bands, like the above-described filter unless specified otherwise.

The overview of the New Waveform technology has been described above with reference to FIG. 1 and FIG. 2.

<1.2. Technical Problem>

Next, a technical problem according to an embodiment of the present disclosure will be described.

As described above, the New Waveform technology enables power leaking to the OOBs to be further reduced by applying the filter (e.g., a Dolph Chebyshev filter) to the transmission signal. When the New Waveform technology is supported, it is desirable to apply a filter in a more preferable mode in accordance with a transmission/reception environment or a use case. In particular, when the above-described filter is applied, for example, there are cases in which transmission/reception processing amounts or characteristics of a filter-applied signal differ depending on whether the filter is applied with a series of resource elements in one unit or the filter is applied with the resource elements in finer units. Thus, for example, a determination method of a unit to which a filter is applied and a method of transmitting the determined unit to another apparatus are important matters to be discussed for supporting the New Waveform technology.

Therefore, in description of the present disclosure, in particular, a determination method of a unit to which a filter is applied and a transmission method of the unit will be focused on as an example of a mechanism for applying a filter for improving frequency use efficiency in a more preferable mode.

2. CONFIGURATION EXAMPLES

<2.1. Configuration Example of System>

Figure 3:
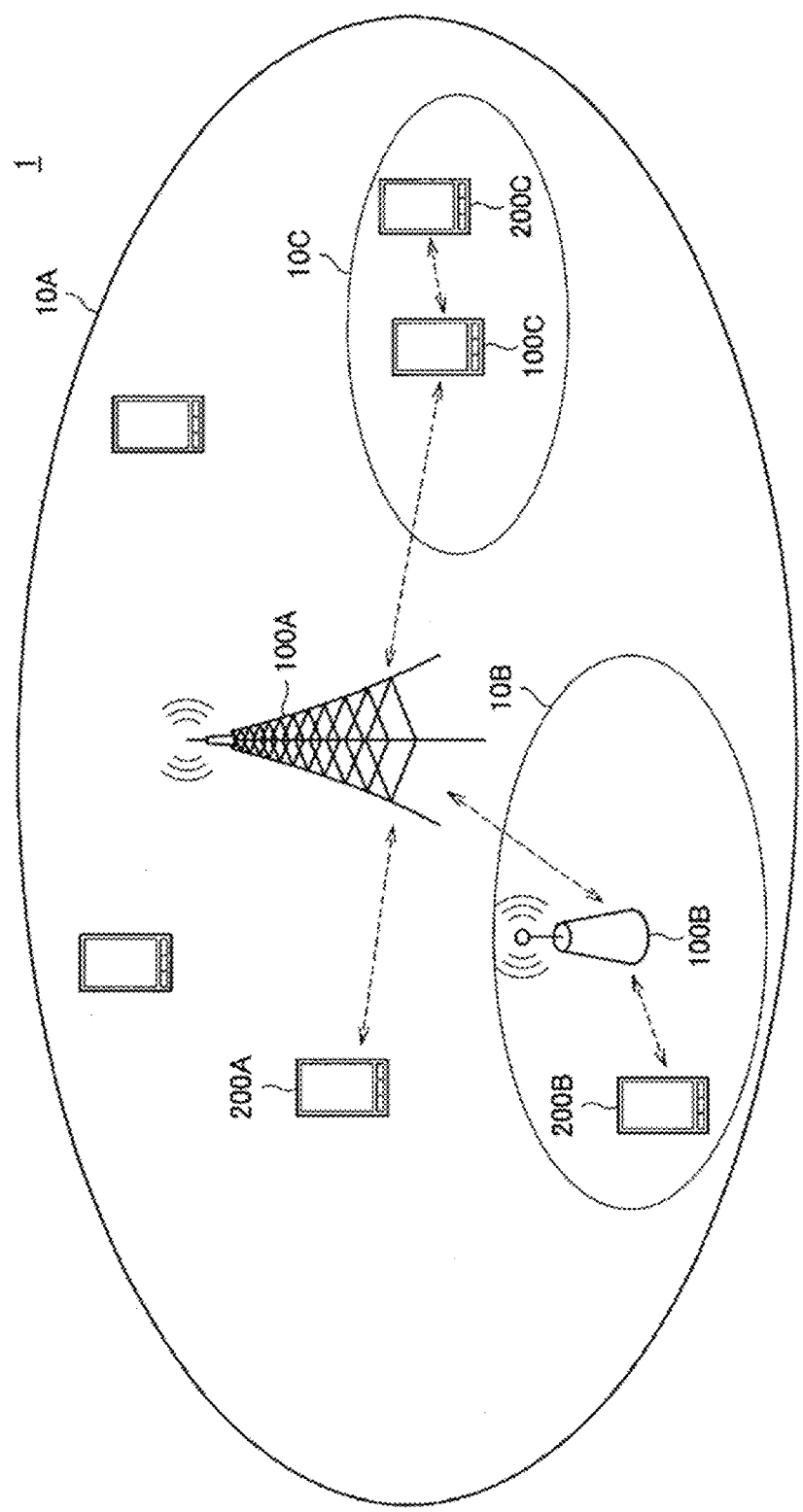
FIG. 3 is an explanatory diagram for explaining an example of a schematic configuration of a system according to an embodiment of the present disclosure.

First, an example of a schematic configuration of a system 1 according to an embodiment of the present disclosure will be described with reference to FIG. 3. FIG. 3 is an explanatory diagram for explaining an example of a schematic configuration of the system 1 according to the embodiment of the present disclosure. As illustrated in FIG. 3, the system 1 includes radio communication apparatuses 100 and terminal apparatuses 200. Here, the terminal apparatuses 200 are also called users. The users can also be called UE. The radio communication apparatus 100C is also called UE-Relay. Here, UE may be UE defined in LTE or LTE-A, and the UE-Relay may be Prose UE to Network Relay discussed in the 3GPP, or may more generally mean a communication device.

(1) Radio Communication Apparatus 100

Each of the radio communication apparatuses 100 is an apparatus that provides radio communication services to apparatuses under its control. The radio communication apparatus 100 is a base station of a cellular system (or mobile communication system). The base station 100A performs radio communication with an apparatus (e.g., the terminal apparatus 200A) located in a cell 10A of the base station 100A. For example, the base station 100A transmits a downlink signal to the terminal apparatus 200A, and receives an uplink signal from the terminal apparatus 200A.

The base station 100A and another base station are logically connected through, for example, an X2 interface and can transmit and receive control information and the like to and from each other. In addition, the base station 100A and a so-called core network (illustration of which is omitted) are logically connected through, for example, an S1 interface and can transmit and receive control information and the like to and from each other. Note that communication between the apparatuses can be physically relayed by various apparatuses.

Here, the radio communication apparatus 100A illustrated in FIG. 3 is a macro cell base station, and a cell 10A is a macro cell. Meanwhile, the radio communication apparatuses 100B and 100C are master devices each operating small cells 10B and 10C. As an example, the master device 100B is a fixedly installed small cell base station. The small cell base station 100B establishes each of a radio backhaul link with the macro cell base station 100A and an access link with one or more terminal apparatuses (e.g., the terminal apparatus 200B) within the small cell 10B. Note that the radio communication apparatus 100B may be a relay node defined in the 3GPP. The master device 100C is a dynamic access point (AP). The dynamic AP 100C is a mobile device dynamically operating the small cell 10C. The dynamic AP 100C establishes each of a radio backhaul link with the macro cell base station 100A and an access link with one or more terminal apparatuses (e.g., the terminal apparatus 200C) within the small cell 10C. The dynamic AP 100C may be, for example, a terminal apparatus in which hardware or software that can operate as a base station or a radio access point is mounted. The small cell 10C of that case is a dynamically formed local network (localized network/virtual cell).

The cell 10A may be managed in accordance with an arbitrary radio communication scheme, for example, LTE, LTE-A (LTE-Advanced), GSM (registered trademark), UMTS, W-CDMA, CDMA 200, WiMAX, WiMAX 2, IEEE 802.16, or the like.

Note that a small cell is a concept in which the cell can be disposed to overlap or not to overlap a macro cell and include various kinds of cells smaller than the macro cell (e.g., a femto cell, a nano cell, a pico cell, a micro cell, and the like). In a certain example, a small cell is managed by a dedicated base station. In another example, a small cell is managed when a terminal serving as a master device temporarily operates as a small cell base station. A so-called relay node can also be deemed as a form of a small cell base station. A radio communication apparatus functioning as a master station of a relay node is also called a donor base station. A donor base station may mean a DeNB in LTE or more generally mean a master station of a relay node.

(2) Terminal Apparatus 200

The terminal apparatus 200 can perform communication in a cellular system (or mobile communication system). The terminal apparatus 200 performs radio communication with a radio communication station (e.g., the base station 100A, or the master apparatus 100B or 100C) of the cellular system. For example, the terminal apparatus 200A receives a downlink signal from the base station 100A, and transmits an uplink signal to the base station 100A.

(3) Supplement

Although the schematic configuration of the system 1 has been introduced above, the present technology is not limited to the example illustrated in FIG. 3. As a configuration of the system 1, for example, a configuration with no master device, Small Cell Enhancement (SCE), a heterogeneous network (HetNet), a machine type communication (MTC) network, or the like can be adopted.

<2.2. Configuration Example of Base Station>

Figure 4:
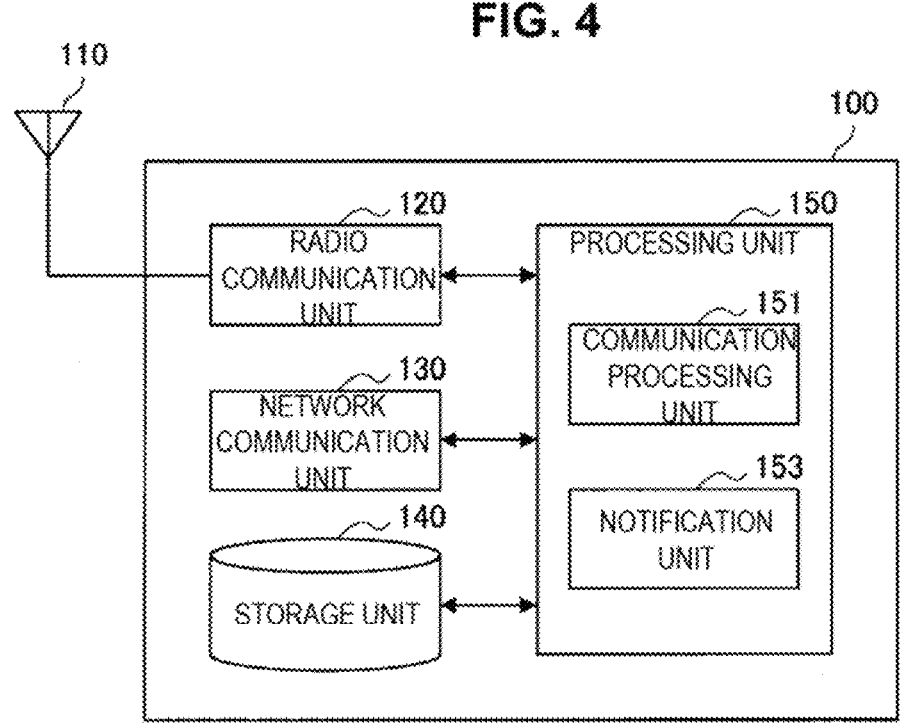
FIG. 4 is a block diagram illustrating an example of a configuration of a base station according to the embodiment.

Next, the configuration of the base station 100 according to an embodiment of the present disclosure will be described with reference to FIG. 4. FIG. 4 is a block diagram illustrating the example of the configuration of the base station 100 according to an embodiment of the present disclosure. According to FIG. 4, the base station 100 includes an antenna unit 110, a radio communication unit 120, a network communication unit 130, a storage unit 140, and a processing unit 150.

(1) Antenna Unit 110

The antenna unit 110 radiates signals output by the radio communication unit 120 out into space as radio waves. In addition, the antenna unit 110 converts radio waves in the space into signals, and outputs the signals to the radio communication unit 120.

(2) Radio Communication Unit 120

The radio communication unit 120 transmits and receives signals. For example, the radio communication unit 120 transmits a downlink signal to a terminal apparatus, and receives an uplink signal from a terminal apparatus.

(3) Network Communication Unit 130

The network communication unit 130 transmits and receives information. For example, the network communication unit 130 transmits information to other nodes, and receives information from other nodes. For example, the other nodes include another base station and a core network node.

(4) Storage Unit 140

The storage unit 140 temporarily or permanently stores a program and various data for operation of the base station 100.

(5) Processing Unit 150

The processing unit 150 provides various functions of the base station 100. The processing unit 150 includes a communication processing unit 151 and a notification unit 153. Further, the processing unit 150 may further include other components in addition to these components. That is, the processing unit 150 may perform operations in addition to operations of these components.

Note that operations of the communication processing unit 151 and the notification unit 153 will be described below in detail.

<2.3. Configuration Example of Terminal Apparatus>

Figure 5:
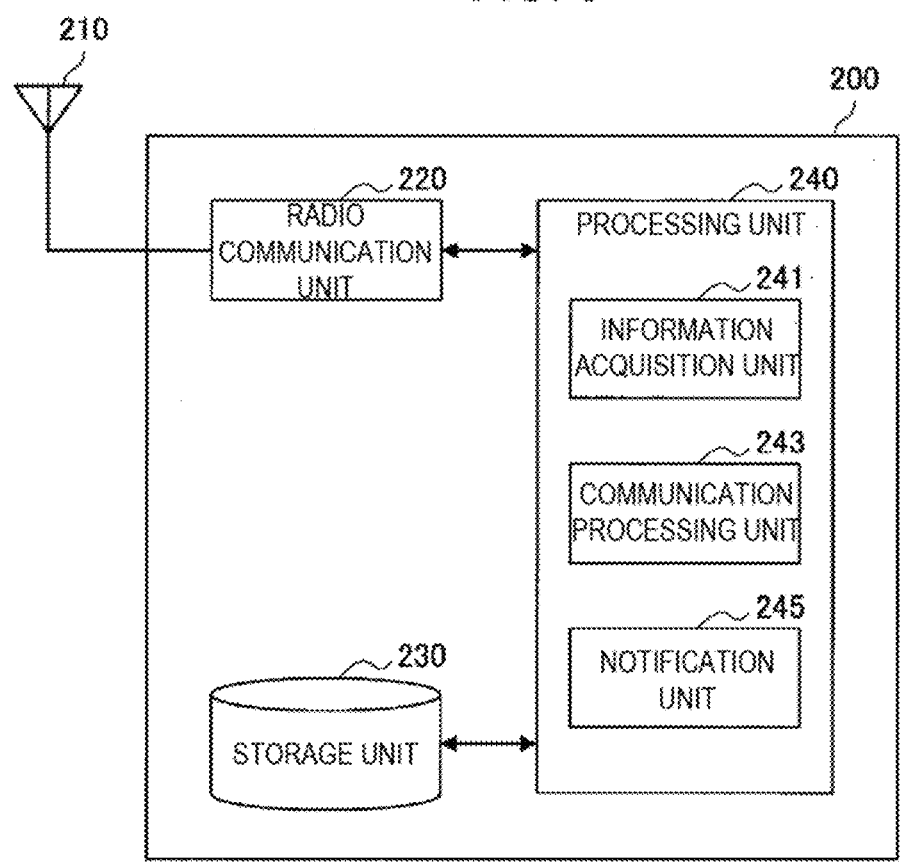
FIG. 5 is a block diagram illustrating an example of a configuration of a terminal apparatus according to the embodiment.

Next, an example of the configuration of the terminal apparatus 200 according to an embodiment of the present disclosure will be described with reference to FIG. 5. FIG. 5 is a block diagram illustrating the example of the configuration of the terminal apparatus 200 according to an embodiment of the present disclosure. As illustrated in FIG. 5, the terminal apparatus 200 includes an antenna unit 210, a radio communication unit 220, a storage unit 230, and a processing unit 240.

(1) Antenna Unit 210

The antenna unit 210 radiates signals output by the radio communication unit 220 out into space as radio waves. In addition, the antenna unit 210 converts radio waves in the space into signals, and outputs the signals to the radio communication unit 220.

(2) Radio Communication Unit 220

The radio communication unit 220 transmits and receives signals. For example, the radio communication unit 220 receives a downlink signal from a base station, and transmits an uplink signal to a base station.

(3) Storage Unit 230

The storage unit 230 temporarily or permanently stores a program and various data for operation of the terminal apparatus 200.

(4) Processing Unit 240

The processing unit 240 provides various functions of the terminal apparatus 200. For example, the processing unit 240 includes an information acquisition unit 241, a communication processing unit 243, and a notification unit 245. Note that the processing unit 240 may further include a structural element other than these structural elements. That is, the processing unit 240 may perform operation other than the operation of these structural elements.

Note that operations of the information acquisition unit 241, the communication processing unit 243, and the notification unit 245 will be described below in detail.

3. TECHNICAL FEATURES

Next, technical features of the present disclosure will be described.

(1) Processes by Each Apparatus (a) Processes by Transmission Apparatus

Figure 6:
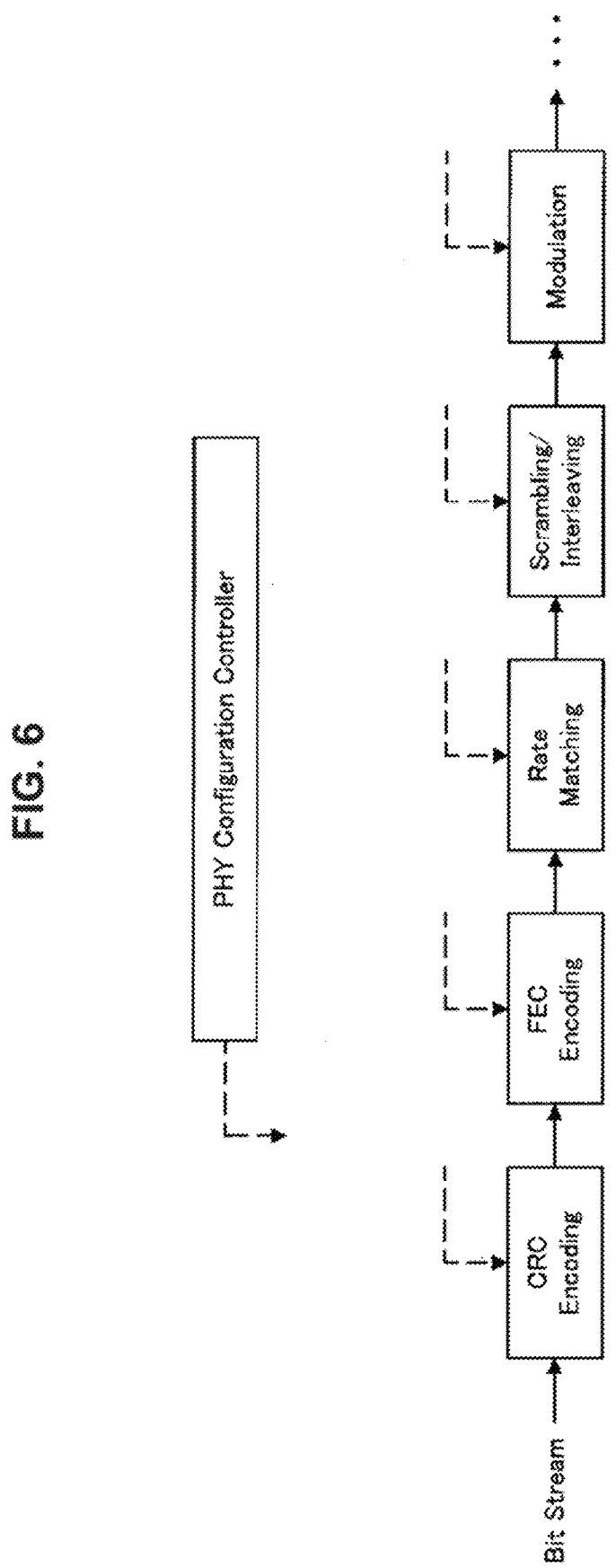
FIG. 6 is an explanatory diagram for explaining an example of a process performed by a transmission apparatus that supports the New Waveform technology.
Figure 7:
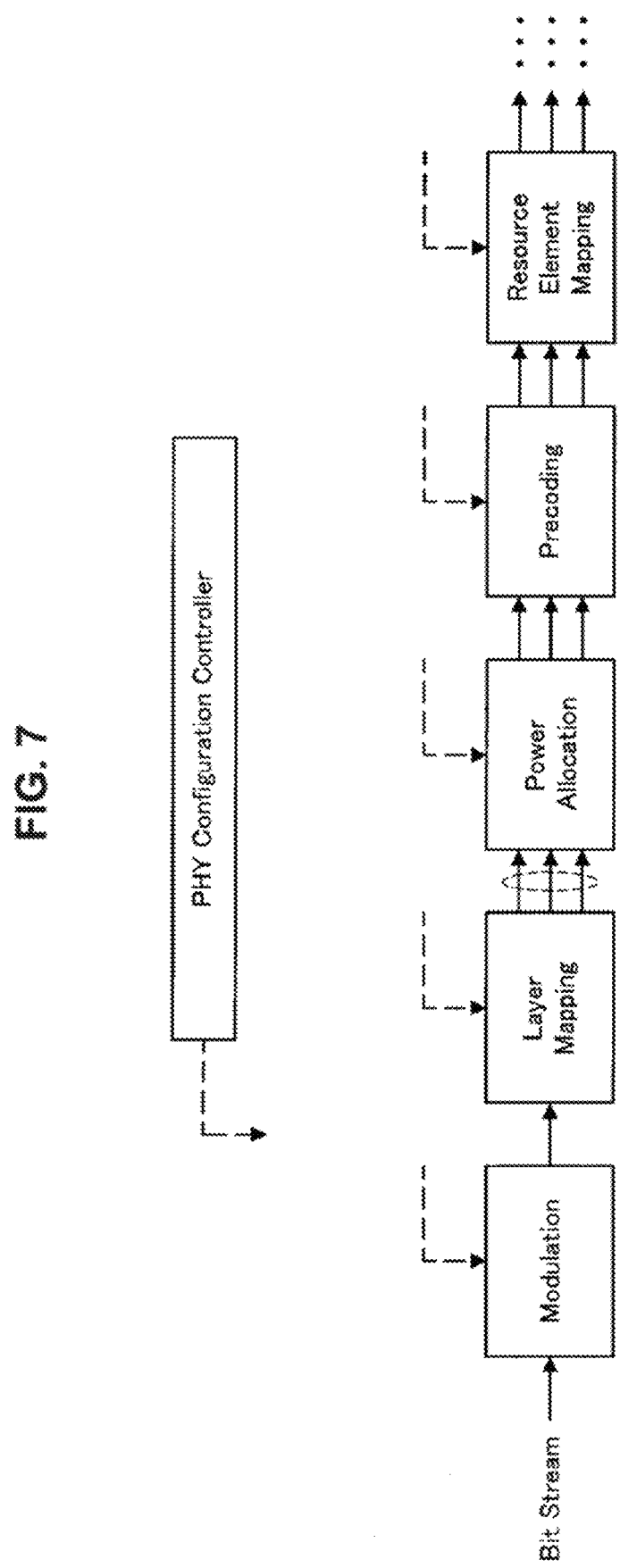
FIG. 7 is an explanatory diagram for explaining an example of a process performed by a transmission apparatus that supports the New Waveform technology.

First, examples of processes performed by a transmission apparatus that supports the New Waveform technology will be described with reference FIG. 6, FIG. 7, and FIG. 8A. FIG. 6, FIG. 7, and FIG. 8A are explanatory diagrams for explaining examples of processes performed by the transmission apparatus that supports the New Waveform technology. A bit stream (e.g., a transport block) of each user is processed as illustrated in FIG. 6, FIG. 7, and FIG. 8A. On the bit stream of each user, several processes, for example, cyclic redundancy check (CRC) coding, forward error correction (FEC) coding, rate matching, and scrambling/interleaving) are performed as illustrated in FIG. 6, and then modulation is performed. Then, on the modulated bit stream, layer mapping, power allocation, precoding, resource element mapping are performed, and bit streams of each of antenna elements are output as illustrated in FIG. 7.

The bit streams of each of the antennas are divided into units decided on the basis of a size (in other words, the number of resources) in at least any of a frequency direction and a time direction having resource elements as minimum units. At this time, each of the units includes one or more resource elements. In addition, each of the units is subjected to a filtering process for further limiting frequency bandwidths to be used as guard bands. Note that the units are units to which a filter is applied (which will also be referred to as "filter application units" below). In the example illustrated in FIG. 8A, for example, each of resource elements constituting a resource block is divided into B units from 0 to B−1, and a process relating to filter application is executed on each of the units. Specifically, the bit stream of each antenna is subjected to a filtering process after an IFFT or IDFT process is performed on each unit. Note that a determination method of a filter application unit will be separated described below in detail.

Then, the bit streams of each of the units that have undergone the filtering process are added together, guard intervals are added thereto if necessary, conversion from digital to analog/radio frequency (RF) or the like is performed thereon, and then the results are transmitted from each of the antennas.

Note that each of the above-described processes performed by the transmission apparatus may be executed on the basis of control by a predetermined control unit (e.g., the PHY configuration controller in the drawing).

Figure 8B:
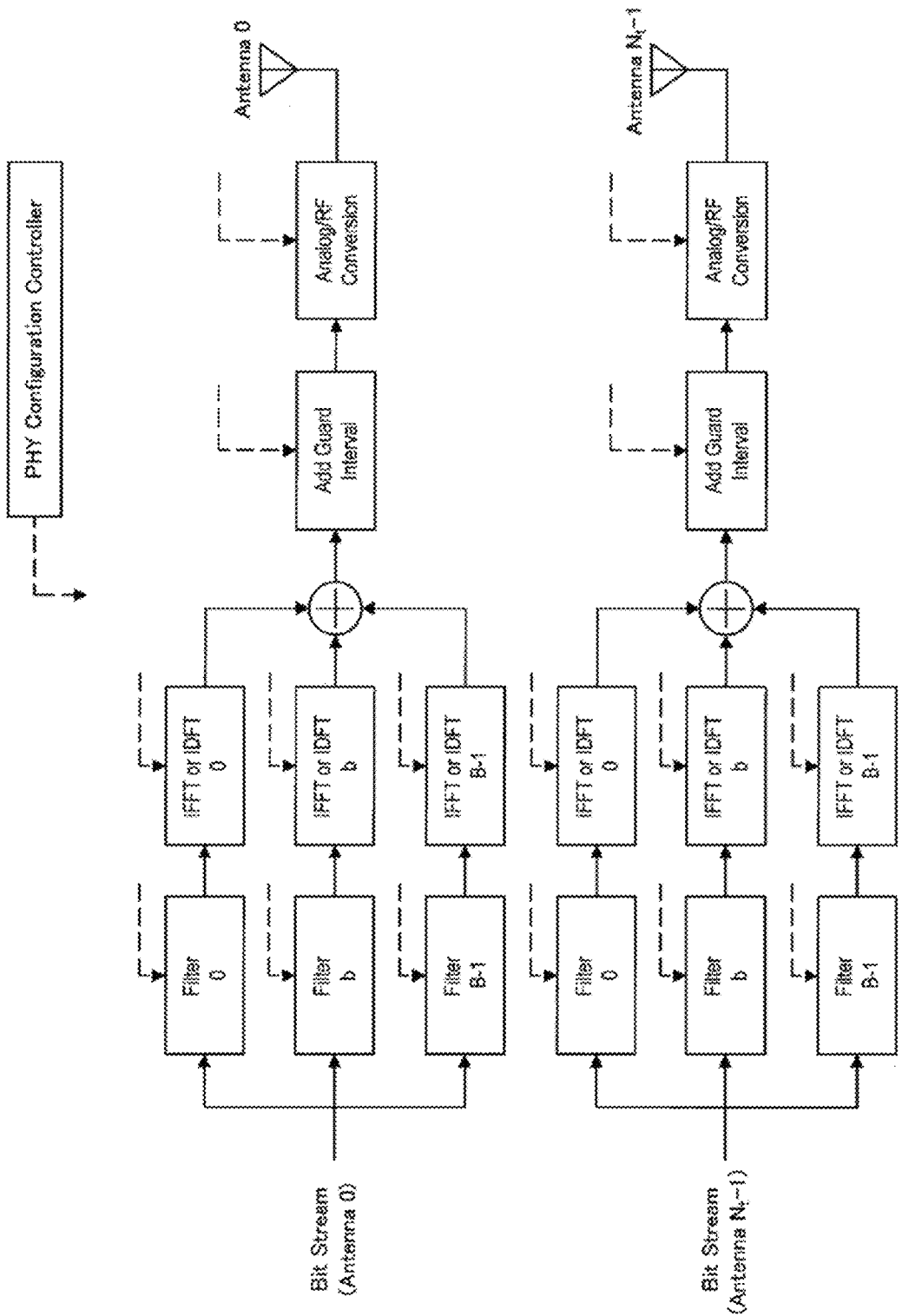
FIG. 8B is an explanatory diagram for explaining an example of a process performed by a transmission apparatus that supports the New Waveform technology.
Figure 9:
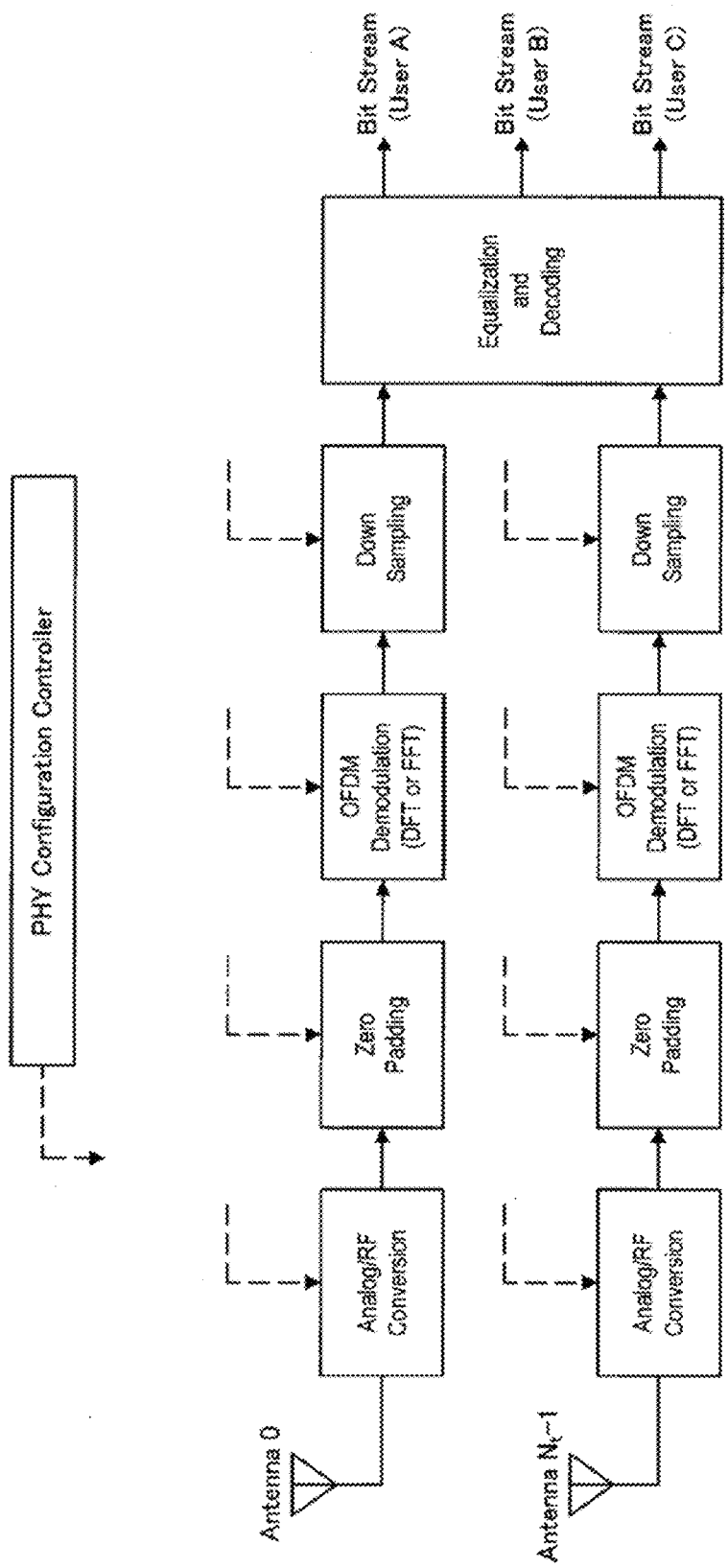
FIG. 9 is an explanatory diagram for explaining an example of a process performed by a reception apparatus that supports the New Waveform technology.

In addition, although the example in which the filter is applied to the bit streams (i.e., transmission signals) of each of the antennas in the time domain has been described above, a filter may be applied thereto in the frequency domain. For example, FIG. 8B is an explanatory diagram for describing an example of a process performed by the transmission apparatus that supports the New Waveform technology, and the example in which a filter is applied to bit streams of each of antennas in the frequency domain is shown. In this case, the filtering process may be performed on each of units of the bit streams of each of the antennas and then the IFFT or IDFT process may be performed on the filtering-processed units as illustrated in FIG. 8B. Note that the following processes are similar to the case in which the filter is applied in the time domain as illustrated in FIG. 8A.
(b) Processes by Reception Apparatus Next, an example of processes performed by a reception apparatus that supports the New Waveform technology will be described with reference to FIG. 9. FIG. 9 is an explanatory diagram for explaining the example of the processes performed by the reception apparatus that supports the New Waveform technology.

As illustrated in FIG. 9, processes of conversion from RF/analog to digital, zero padding, a discrete Fourier transform (DFT)/fast Fourier transform (FFT), down sampling, equalization and decoding, and the like are performed on a signal received by each of antennas. Note that, in the reception apparatus that supports the New Waveform technology, the inverse process of the filtering process based on the New Waveform technology is performed at the time of equalization and decoding. As a result, bit streams ((e.g., transport blocks) for respective users are obtained. Note that more details of the reception process will be described below along with description of a reception signal.

In addition, each of the above-described processes performed by the reception apparatus may be executed on the basis of control by a predetermined control unit (e.g., the PHY configuration controller in the drawing).
(2) Transmission Signal and Reception Signal Next, a transmission signal and a reception signal in a case in which the New Waveform technology is supported will be described. Note that, in the present description, a multi-cell system of a heterogeneous network (HetNet), Small Cell Enhancement (SCE), or the like is assumed. In addition, in the present description, an index corresponding to a subcarrier, a symbol, a sample, a slot, and an index corresponding to a subframe will not be described unless specified otherwise.

A reception apparatus that is a transmission target is set to u, and the number of transmission antennas of a transmission apparatus that transmits a signal to the reception apparatus is set to $N_t$. Note that each of the transmission antennas is also called a "transmission antenna port." Here, a transmission signal to the reception apparatus u can be expressed in a vector format as indicated by the following (Formula 1).

[Math. 1]

(Formula 1)

$$x_u = \begin{bmatrix} x_{u,0,0} & \cdots & x_{u,0,N+N_{GI}+N_f-2} \\ \vdots & \ddots & \vdots \\ x_{u,N_t-1,0} & \cdots & x_{u,N_t-1,N+N_{GI}+N_f-2} \end{bmatrix}^T$$

$$= \sum_{b=0}^{B-1} \Omega_{u,b} G_{u,b} F^H P_{u,b} W_{u,b} S_{u,b}$$

$$= \sum_{b=0}^{B-1} \left( \underbrace{\begin{bmatrix} I_{N+N_f-1} \\ 0 \\ \vdots \\ 0 \end{bmatrix}}_{\Omega_{u,b}[(N+N_f+N_{GI}-1)\times(N+N_f-1)]} \underbrace{\begin{bmatrix} g_{u,b}(0) & 0 & \cdots & 0 \\ \vdots & g_{u,b}(0) & \ddots & \vdots \\ g_{u,b}(N_f-1) & \vdots & \ddots & 0 \\ 0 & g_{u,b}(N_f-1) & \ddots & g_{u,b}(0) \\ \vdots & \vdots & \ddots & \vdots \\ 0 & 0 & \cdots & g_{u,b}(N_f-1) \end{bmatrix}}_{G_{u,b}[(N+N_f-1)\times N]} \underbrace{\begin{bmatrix} e^{(-i2\pi/N)\cdot 0} & e^{(-i2\pi/N)\cdot 0} & \cdots & e^{(-i2\pi/N)(N-1)\cdot 0} \\ e^{(-i2\pi/N)\cdot 0} & e^{(-i2\pi/N)\cdot 1} & \cdots & e^{(-i2\pi/N)(N-1)\cdot 1} \\ \vdots & \vdots & \ddots & \vdots \\ e^{(-i2\pi/N)\cdot 0} & e^{(-i2\pi/N)(N-1)} & \cdots & e^{(-i2\pi/N)(N-1)(N-1)} \end{bmatrix}^H}_{F^H [N\times N]} + $$

$$\underbrace{\begin{bmatrix} P_{u,b,0,0} & \cdots & P_{u,b,N_t-1,0} \\ \vdots & \ddots & \vdots \\ P_{u,b,0,N_t-1} & \cdots & P_{u,b,N_t-1,N_t-1} \end{bmatrix}}_{P_{u,b}[N_t\times N_t]} \underbrace{\begin{bmatrix} W_{u,b,0,0} & \cdots & W_{u,b,0,N_{SS}-1} \\ \vdots & \ddots & \vdots \\ W_{u,b,N_t-1,0} & \cdots & W_{u,b,N_t-1,N_{SS}-1} \end{bmatrix}}_{W_{u,b}[N_{SS}\times N_t]} \underbrace{\begin{bmatrix} S_{u,b,0,0} & \cdots & S_{u,b,0,N-1} \\ \vdots & \ddots & \vdots \\ S_{u,b,N_{SS}-1,0} & \cdots & S_{u,b,N_{SS}-1,N-1} \end{bmatrix}^T}_{S_{u,b}[N_{SS}\times N]} \Bigg),$$

In the above-described (Formula 1), N denotes an FFT size length. In addition, $N_f$ denotes a filter length, and B denotes the number of sub-bands to which a filter is applied. In addition, $N_t$ denotes the number of transmission antennas, and $N_{ss}$ denotes the number of spatial transmission streams. In addition, the vector $S_{u,b}$ denotes a spatial stream signal of the reception apparatus u in a sub-band b. Each element of the vector $S_{u,b}$ basically corresponds to a digital modulation symbol of PSK, QAM, or the like. Here, for example, if sub-band b=0 is assumed to be a set of subcarriers from $0^{th}$ to k−1-th, the condition indicated by the following (Formula 2) is assumed to be satisfied.

[Math. 2]

$$S_{u,0,n_{SS},k} \sim S_{u,0,n_{SS},N-1} = 0 (0 \le n_{ss} \le N_{SS}-1) \quad \text{(Formula 2)}$$

$W_{u,b}$ denotes a precoding matrix for the sub-band b of the reception apparatus u. In addition, $P_{u,b}$ denotes a power allocation coefficient matrix for the sub-band b of the reception apparatus u. Note that each element of the matrix $P_{u,b}$ is desirably a positive real number. In addition, the matrix $P_{u,b}$ may be a so-called diagonal matrix (i.e., a matrix of which elements other than the diagonal elements are 0). The matrix $P_{u,b}$ is expressed by the following (Formula 3), for example.

[Math. 3]

$$P_{u,b} = \begin{bmatrix} P_{u,b,0,0} & 0 & \cdots & 0 \\ 0 & P_{u,b,1,1} & \ddots & \vdots \\ \vdots & \ddots & \ddots & 0 \\ 0 & \cdots & 0 & P_{u,b,N_t-1,N_t-1} \end{bmatrix} \quad \text{(Formula 3)}$$

Note that, if adaptive power allocation for a spatial stream is not performed, a scalar value $P_{u,b}$ may be used instead of the matrix $P_{u,b}$.

The vector F denotes an FFT matrix having a size N, and the vector $G_{u,b}$ denotes a linear convolution matrix of a filter applied to the sub-band b of the reception apparatus u. In addition, the vector $\Omega_{u,b}$ corresponds to insertion of a guard interval (GI). $I_N$ in $\Omega_{u,b}$ denotes a unit matrix with a size N, and $N_{GI}$ denotes a length of a guard interval.

In addition, if a reception signal received by the reception apparatus u in a case in which a transmission signal of a transmission antenna #$n_t$ is received by a reception antenna #$n_r$ is assumed to be $r_{u,nt,nr}$, the reception signal $r_{u,nt,nr}$ is expressed by the following (Formula 4).

[Math. 4]

$$r_{u,n_t,n_r} = \begin{bmatrix} r_{u,n_t,n_r,0} \\ \vdots \\ r_{u,n_t,n_r,N+N_f+N_{GI}+L_h-3} \end{bmatrix}$$
$$= h_{u,n_t,n_r} x_{u,n_t} + n_{u,n_r}$$
$$= \underbrace{\begin{bmatrix} h_{u,n_t,n_r}(0) & 0 & \cdots & 0 \\ \vdots & h_{u,n_t,n_r}(0) & \ddots & \vdots \\ h_{u,n_t,n_r}(L_h-1) & \vdots & \ddots & 0 \\ 0 & h_{u,n_t,n_r}(L_h-1) & \ddots & h_{u,n_t,n_r}(0) \\ \vdots & \vdots & \ddots & \vdots \\ 0 & 0 & \cdots & h_{u,n_t,n_r}(L_h-1) \end{bmatrix}}_{h_u[(N+N_f+N_{GI}+L_h-2)\times(N+N_f+N_{GI}-1)]}$$
$$\underbrace{\begin{bmatrix} x_{u,n_t,0} \\ x_{u,n_t,1} \\ \vdots \\ \vdots \\ \vdots \\ x_{u,n_t,N+N_f+N_{CP}-1} \end{bmatrix}}_{x_{u,n_t}[(N+N_f+N_{GI}-1)\times 1]} + \underbrace{\begin{bmatrix} n_{u,n_r,0} \\ n_{u,n_r,1} \\ \vdots \\ \vdots \\ \vdots \\ n_{u,n_r,N+N_f+N_{CP}+L_h-3} \end{bmatrix}}_{n_{u,n_r}[(N+N_f+N_{GI}+L_h-2)\times 1]}$$

(Formula 4)

Note that, in the above-described (Formula 4), $L_h$ denotes the number of transmission line paths. In addition, the matrix $h_{u,nt,nr}$ denotes a channel response matrix between the transmission antenna $n_t$ and the reception antenna $n_r$. Note that each element of the matrix $h_{u,nt,nr}$ is basically a complex number. In addition, the vector $n_{u,nr}$ denotes noise of the reception antenna $n_r$ of the reception apparatus u. Note that the noise $n_{u,nr}$ includes, for example, thermal noise or interference from a system other than the system that is the object of the present disclosure. Note that average noise power is denoted by $\sigma_{n,u}^2$.

In addition, in the case in which the New Waveform technology is supported, the above-described reception signal $r_{u,nt,nr}$ corresponds to a signal to which the above-described filter $G_{u,b}$ has been applied. Thus, in the course of performing a DFT/FFT, and equalization and decoding on the reception signal $r_{u,nt,nr}$, the inverse processes of the above-described processes to which the filter $G_{u,b}$ is applied are performed.

Specifically, a signal length (i.e., the number of sample symbols) of the reception signal $r_{u,nt,nr}$ increases by a filter length of the filter $G_{u,b}$ in accordance with the above-described application of the filter $G_{u,b}$. Thus, it is necessary for the reception apparatus u at the time of the DFT/FFT process (i.e., during OFDM decoding) performed on the reception signal $r_{u,nt,nr}$ to consider a size of the filter length and a size of a delay of a channel in addition to the size of the IFFT at the time of the transmission process. Thus, the reception apparatus u adjusts the signal length of the reception signal $r_{u,nt,nr}$ to be 2N by executing, for example, zero padding from the end of the reception signal $r_{u,nt,nr}$.

Next, the reception apparatus u converts the reception signal $r_{u,nt,nr}$ that has undergone zero padding into a signal of the frequency domain by applying the DFT/FFT of the size 2N thereto and applies ½ down sampling to the converted signal. Through this process, the signal length of the reception signal that has been adjusted to 2N by performing zero padding thereon is adjusted to N through ½ down sampling.

In addition, the reception apparatus u can decode a transmitted spatial stream signal by executing frequency domain equalization on the down-sampled reception signal. For example, a minimum mean square error (MMSE) weight is conventionally created in consideration of the channel matrix $h_{u,nr,nr}$, the precoding matrix $W_{u,b}$, and the noise power $\sigma_{u,n}^2$. With respect to this, in the case in which the New Waveform technology is supported like the present disclosure, an equalization weight is created further in consideration of the filter matrix Go applied in the transmission signal process in addition to the above.

The transmission signal and the reception signal in the case in which the New Waveform technology is supported have been described above.

(3) Filter Application Unit

Next, a filter application unit will be described in detail with reference to FIG. 10 to FIG. 12. As described above, a filter application unit (i.e., the above-described unit) for further limiting a frequency bandwidth to be used as a guard band is determined on the basis of a size (i.e., the number of resources) in at least one of a frequency direction and a time direction with a resource element as a minimum unit. More precisely, the filter application unit is determined by setting a minimum time-frequency unit used in transmission as a minimum unit to which a filter is applied.

In the case of LTE/LTE-A, for example, one symbol of one subcarrier is defined as a resource element, and a filter application unit is determined by setting the resource element as a minimum unit. Note that, in LTE/LTE-A, as a configuration of a resource block (i.e., a method of dividing a resource block into resource elements), the three cases illustrated in FIG. 10 to FIG. 12 are assumed, and sizes of resource elements (i.e., a band of one subcarrier and a symbol length of one symbol) differ in each of the cases. FIG. 10 to FIG. 12 are explanatory diagrams for explaining examples of configurations of resource blocks.

Figure 10:
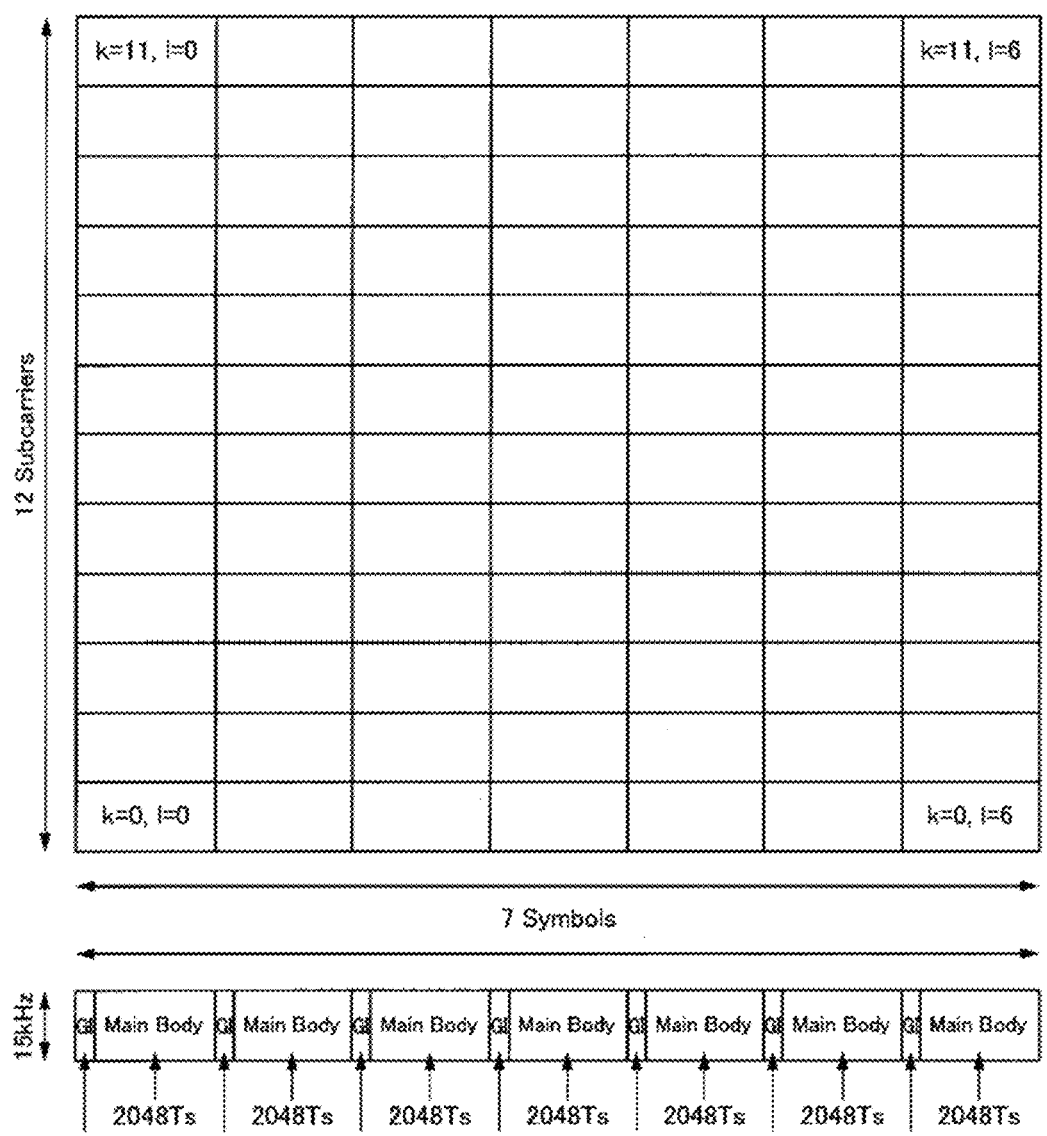
FIG. 10 is an explanatory diagram for explaining an example of a configuration of a resource block.

FIG. 10 illustrates an example of a configuration of a resource block, for example, in a case in which the number of symbols is set to 7 and the number of subcarriers is set to 12. In this case, the band of one subcarrier is 15 kHz, and the symbol length of one symbol is 2208 Ts or 2192 Ts when Ts=1/30720 [ms]. That is, in the example illustrated in FIG. 10, a minimum unit to which a filter is applied is 15 kHz×2208 Ts (in the case of #0 symbol).

Figure 11:
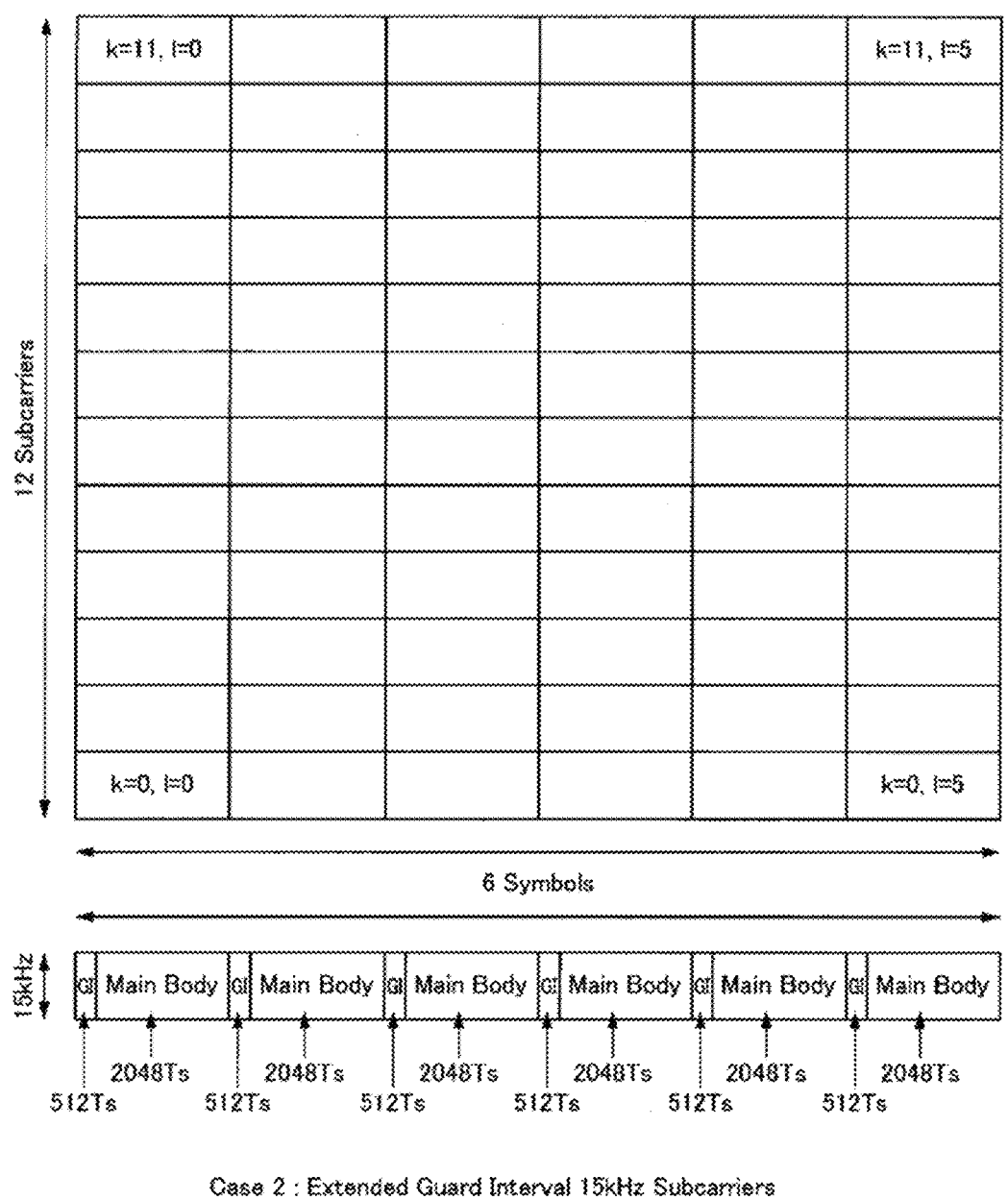
FIG. 11 is an explanatory diagram for explaining an example of a configuration of a resource block.

In addition, FIG. 11 illustrates an example of a configuration of a resource block in a case in which the number of symbols is set to 6 and the number of subcarriers is set to 12. In this case, the band of one subcarrier is 15 kHz and the symbol length of one symbol is 2560 Ts. That is, in the example illustrated in FIG. 11, a minimum unit to which a filter is applied is 15 kHz×2560 Ts.

Figure 12:
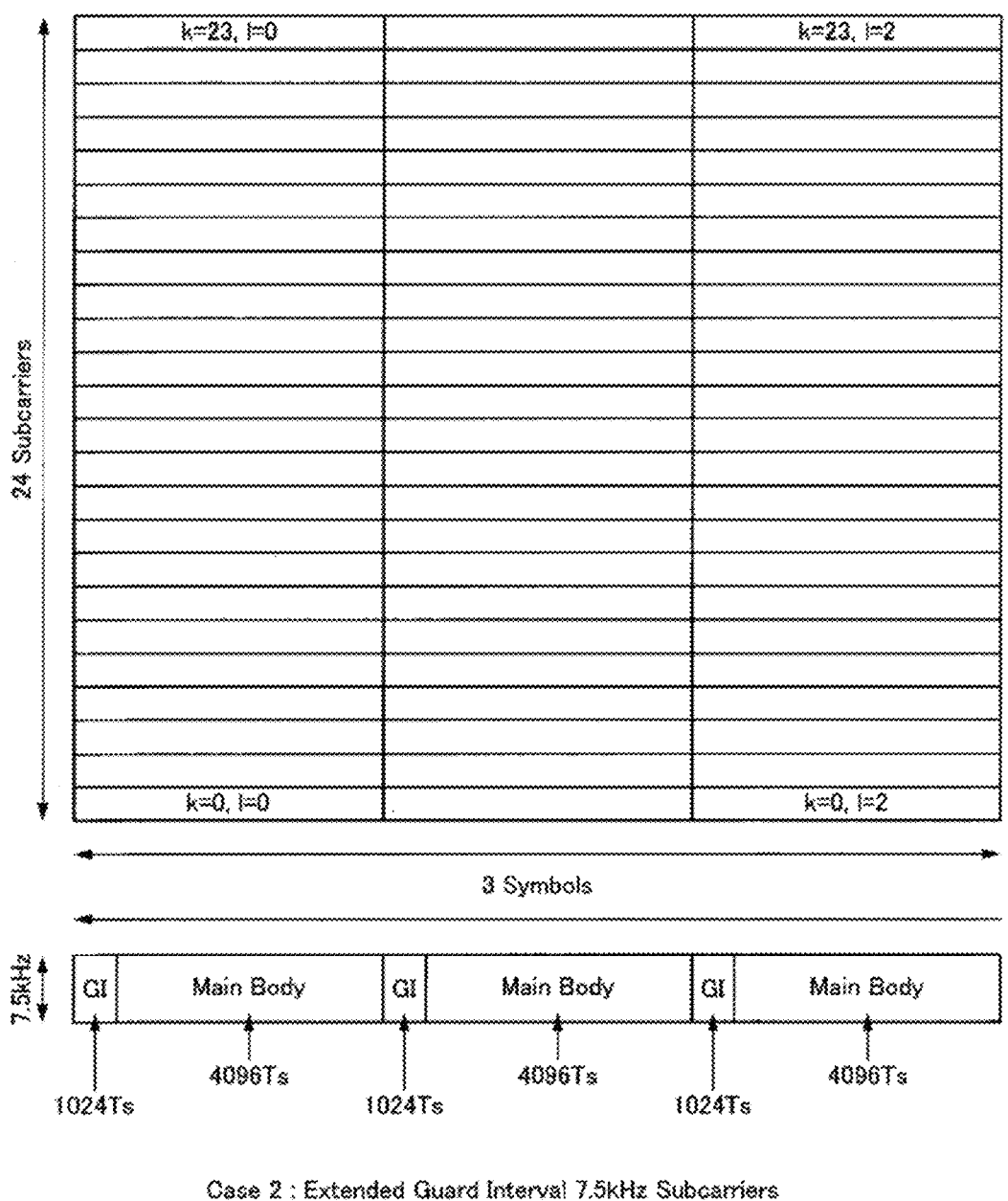
FIG. 12 is an explanatory diagram for explaining an example of a configuration of a resource block.

In addition, FIG. 12 illustrates an example of a configuration of a resource block in a case in which the number of symbols is set to 3 and the number of subcarriers is set to 24. In this case, the band of one subcarrier is 7.5 kHz and the symbol length of one symbol is 5120 Ts. That is, in the example illustrated in FIG. 12, a minimum unit to which a filter is applied is 7.5 kHz×5120 Ts.

Note that the above-described examples are merely examples, and a configuration of the filter application unit is not necessarily limited to the examples described with reference to FIG. 10 to FIG. 12 as long as a minimum time-frequency unit used in transmission is determined to be a minimum unit to which a filter is applied. For example, a case in which a plurality of sub-symbols are defined by further dividing one symbol can be assumed depending on a modulation scheme. In this case, for example, one sub-carrier×one sub-symbol may be set as a minimum unit to which a filter is applied.

(4) Filter Application Unit Determination Method

Successively, an example of a method of determining a filter application unit will be described. With respect to a filter application unit, a case in which a predetermined application unit thereof is fixedly used (i.e., a fixed case) and a case in which a predetermined application unit thereof is changeable in accordance with a situation (i.e., a variable case) are exemplified. In addition, as the cases in which a filter application unit is variable, a case in which the application unit is semi-statically determined and a case in which the application unit is dynamically determined are exemplified. Thus, the case in which a filter application unit is fixed, the case in which the filter application unit is semi-statically determined, and the case in which the filter application unit is dynamically determined will be each described in detail.

(a) Case in which Filter Application Unit is Fixed

First, the case in which a filter application unit is fixed will be described. In the case in which a filter application unit is fixed, the filter application unit is determined as a specification (e.g., a communication protocol, etc.), and a base station and a terminal apparatus apply filters to transmission signals in each unit on the basis of the specification. For example, the following Table 1 shows examples of settings (specifications) of filter application units in the case of LTE. Note that, in Table 1, "Application Unit" represents units that are filter application targets, i.e., filter application units.

TABLE 1

Filter application units

| Type | 1 Subcarrier band width | 1 Symbol length | Band width | Application Unit |
|---|---|---|---|---|
| 0 | 15 kHz | 2208$T_s$ or 2192$T_s$ | 1.4 MHz | 72 Subcarrier × 1 Symbol (or Subsymbol) |
| 1 | 15 kHz | 2560$T_s$ | 1.4 MHz | 72 Subcarrier × 1 Symbol (or Subsymbol) |
| 2 | 7.5 kHz | 5120$T_s$ | 1.4 MHz | 144 Subcarrier × 1 Symbol (or Subsymbol) |
| 3 | 15 kHz | 2208$T_s$ or 2192$T_s$ | 3 MHz | 180 Subcarrier × 1 Symbol (or Subsymbol) |
| 4 | 15 kHz | 2560$T_s$ | 3 MHz | 180 Subcarrier × 1 Symbol (or Subsymbol) |
| 5 | 7.5 kHz | 5120$T_s$ | 3 MHz | 360 Subcarrier × 1 Symbol (or Subsymbol) |
| 6 | 15 kHz | 2208$T_s$ or 2192$T_s$ | 5 MHz | 300 Subcarrier × 1 Symbol (or Subsymbol) |
| 7 | 15 kHz | 2560$T_s$ | 5 MHz | 300 Subcarrier × 1 Symbol (or Subsymbol) |
| 8 | 7.5 kHz | 5120$T_s$ | 5 MHz | 600 Subcarrier × 1 Symbol (or Subsymbol) |
| 9 | 15 kHz | 2208$T_s$ or 2192$T_s$ | 10 MHz | 600 Subcarrier × 1 Symbol (or Subsymbol) |
| 10 | 15 kHz | 2560$T_s$ | 10 MHz | 600 Subcarrier × 1 Symbol (or Subsymbol) |
| 11 | 7.5 kHz | 5120$T_s$ | 10 MHz | 1200 Subcarrier × 1 Symbol (or Subsymbol) |
| 12 | 15 kHz | 2208$T_s$ or 2192$T_s$ | 15 MHz | 900 Subcarrier × 1 Symbol (or Subsymbol) |
| 13 | 15 kHz | 2560$T_s$ | 15 MHz | 900 Subcarrier × 1 Symbol (or Subsymbol) |
| 14 | 7.5 kHz | 5120$T_s$ | 15 MHz | 1800 Subcarrier × 1 Symbol (or Subsymbol) |
| 15 | 15 kHz | 2208$T_s$ or 2192$T_s$ | 20 MHz | 1200 Subcarrier × 1 Symbol (or Subsymbol) |
| 16 | 15 kHz | 2560$T_s$ | 20 MHz | 1200 Subcarrier × 1 Symbol (or Subsymbol) |
| 17 | 7.5 kHz | 5120$T_s$ | 20 MHz | 2400 Subcarrier × 1 Symbol (or Subsymbol) |
| 18 | 15 kHz | 2208$T_s$, 2192$T_s$ or 2560$T_s$ | 1.4, 3, 5, 10, 15 or 20 MHz | 12 Subcarrier × 1 Symbol (or Subsymbol) |
| 19 | 7.5 kHz | 5120$T_s$ | 1.4, 3, 5, 10, 15 or 20 MHz | 24 Subcarrier × 1 Symbol (or Subsymbol) |
| 20 | 7.5 or 15 kHz | 2208$T_s$, 2192$T_s$ or 2560$T_s$ | 1.4, 3, 5, 10, 15 or 20 MHz | 1 Subcarrier × 1 Symbol (or Subsymbol) |

Note that the examples denoted by Type 0 to Type 17 in the above-described Table 1 show examples of settings in a case in which a filter is applied to each symbol (or each sub-symbol) through a bandwidth. Meanwhile, the examples denoted by Type 18 to Type 20 show examples in a case in which a filter is applied in a frequency direction in finer units than in the examples denoted by Type 0 to Type 17.

Note that information representing a filter application unit as shown in Table 1 may be stored by each of the base station and the terminal apparatus in a readable storage area (e.g., the storage unit 140 and the storage unit 230). In addition, as another example, the base station may read the information representing the filter application unit from the predetermined storage area and notify the terminal apparatus of the information regarding the application unit in accordance with the read result.

(b) Case in which Filter Application Unit is Semi-Statically Determined

Next, the case in which a filter application unit is semi-statically determined will be described. In the case in which a filter application unit is semi-statically determined, the base station and the terminal apparatus prescribe candidates for setting that can be taken as a filter application unit in advance. In addition, for example, the base station determines a filter application unit among the candidates prescribed in advance on the basis of a predetermined condition and notifies the terminal apparatus of information regarding the determined application unit (i.e., information regarding a resource to which the filter is applied). Table 2 below shows, for example, an example of candidates for the filter application unit.

TABLE 2

| Filter application units | |
|---|---|
| Index | Application Unit |
| 0 | 1 Subcarrier × 1 Symbol (or Subsymbol) |
| 1 | 12 Subcarrier × 1 Symbol (or Subsymbol) |
| 2 | 24 Subcarrier × 1 Symbol (or Subsymbol) |
| 3 | 72 Subcarrier × 1 Symbol (or Subsymbol) |
| 4 | 144 Subcarrier × 1 Symbol (or Subsymbol) |
| 5 | 180 Subcarrier × 1 Symbol (or Subsymbol) |
| 6 | 300 Subcarrier × 1 Symbol (or Subsymbol) |
| 7 | 360 Subcarrier × 1 Symbol (or Subsymbol) |
| 8 | 600 Subcarrier × 1 Symbol (or Subsymbol) |
| 9 | 900 Subcarrier × 1 Symbol (or Subsymbol) |
| 10 | 1200 Subcarrier × 1 Symbol (or Subsymbol) |
| 11 | 1800 Subcarrier × 1 Symbol (or Subsymbol) |
| 12 | 2400 Subcarrier × 1 Symbol (or Subsymbol) |

Note that the information representing the candidates for the filter application unit shown in Table 2 may be stored by each of the base station and the terminal apparatus in a readable storage area (e.g., the storage unit 140 and the storage unit 230). In addition, as another example, the terminal apparatus may recognize the candidates for the filter application unit when the base station notifies the terminal apparatus of the information representing the candidates for the filter application unit.

Next, determination criteria for determining a filter application unit will be focused on. As determination criteria for determining a filter application unit, there are the following examples.

Bandwidth of the system
Feedback from the terminal apparatus on a communication quality
Retransmission request from the terminal apparatus
Position information of the terminal apparatus
Use application of the terminal apparatus (a request for a communication quality from the terminal apparatus)
Request for switching of a filter application unit from the terminal apparatus Specifically, the base station determines a filter application unit within a bandwidth available for the system.

In addition, since the base station can recognize a channel condition on the basis of feedback from the terminal apparatus on a communication quality, the base station may determine a filter application unit in accordance with a recognition result of the channel condition. As a more specific example, in a case in which channel conditions are deteriorating, a case in which the base station allocates frequencies with channels in better conditions to the terminal apparatus is assumed. However, in such a situation in which channel conditions are deteriorating, a case in which frequencies with channels in better conditions are limited and the range of available frequencies is narrower can be assumed. In such a case, the base station may cause frequencies to be allocated to the terminal apparatus to be narrower and determine a filter application unit in accordance with the frequency allocation. Through such control, a decrease in throughput of the terminal apparatus can be suppressed, frequencies available for other terminal apparatuses can be secured, and further improvement in the throughput of the entire system can also be expected.

In addition, a case in which a filter application unit is determined on the basis of a retransmission request from the terminal apparatus and position information of the terminal apparatus is similar to the case in which a filter application unit is determined on the basis of feedback from the terminal apparatus on a communication quality. In a case in which there is a retransmission request from the terminal apparatus, for example, a possibility of a channel condition deteriorating is conceivable. In addition, there are cases in which a propagation distance between the base station and the terminal apparatus becomes farther depending on a position of the terminal apparatus, and in such a circumstance, there is a possibility of a channel condition deteriorating. In such a case in which a channel condition is deteriorating as described above, the base station may cause frequencies allocated to the terminal apparatus to be narrower and determine a filter application unit in accordance with the frequency allocation.

In addition, a case in which communication qualities requested by the terminal apparatus differ depending on use applications of the terminal apparatus can be assumed. For example, there are cases in which frequency bands allocated to the terminal apparatus may be relatively narrower as in a case in which a packet size may be small or a case in which latency is tolerable depending on use applications of the terminal apparatus. On the other hand, in a case in which a bucket size is larger or a case in which low latency communication is required, there are cases in which it is desirable to allocate a wider frequency band to the terminal apparatus. Assuming such a situation, for example, the base station may determine a bandwidth of a frequency to be allocated to the terminal apparatus in accordance with a request for a communication quality (e.g., Quality-of-Service or QoS) from the terminal apparatus and determine a filter application unit in accordance with the bandwidth.

In addition, in a case in which the base station receives a request for switching of a filter application unit from the terminal apparatus, the base station may switch a filter application unit in accordance with the request. In this case, for example, the base station may allocate a channel to the terminal apparatus in accordance with a condition of a channel with the terminal apparatus, a communication quality requested from the terminal apparatus, or the like, and determine a filter application unit in accordance with the allocation.

Note that, in a case in which a filter application unit is determined (switched), the base station notifies the terminal apparatus of information regarding the determined application unit. Note that, as the information of which the base station notifies the terminal, for example, information directly representing a filter application unit (i.e., the number of subcarriers, the number of symbols, or the like to which a filter is applied), an index value associated with the application unit, and the like are exemplified.

Next, methods of the base station notifying the terminal apparatus of the information representing the filter application unit will be focused. As methods of notifying of the information representing the filter application unit, for example, there are the following examples.

Notifying as part of RRC signaling (RRC Message)
Notifying as part of system information
Notifying as part of downlink control information (DCI)

With the above-described configuration, a filter application unit can be switched in accordance with a situation. In addition, even in a case in which a filter application unit is switched, the terminal apparatus can recognize the switched application unit on the basis of a notification from the base station. In other words, the terminal apparatus can recognize a resource to which the filter is applied in accordance with the switched filter application unit on the basis of a notification from the base station.

Note that, although the case in which the base station determines the filter application unit has been focused on in the above-described example, a main agent that determines the filter application unit is not necessarily limited to the base station. As a specific example, the terminal apparatus may determine the filter application unit. Note that, in that case, the terminal apparatus may notify the base station of the information indicating the determined filter application unit as part of, for example, RRC signaling or uplink control information (UCI).

(c) Case in which Filter Application Unit is Dynamically Determined

Next, the case in which a filter application unit is dynamically determined will be described. In that case, for example, the base station determines a filter application unit on the basis of a predetermined condition, i.e., a predetermined determination criterion for determining a filter application unit. Note that, as information for determining a filter application unit, for example, the number of subcarriers to which a filter is applied, and the number of symbols (or the number of sub-symbols) to which a filter is applied are exemplified.

Note that, as determination criteria for determining a filter application unit, there are the following examples, as in the above-described case in which a filter application unit is semi-statically determined.

Bandwidth of the system
Feedback from the terminal apparatus on a communication quality
Retransmission request from the terminal apparatus
Position information of the terminal apparatus
Use application of the terminal apparatus (a request for a communication quality from the terminal apparatus)
Request for switching of a filter application unit from the terminal apparatus In addition, as methods of the base station notifying the terminal apparatus of the information representing the filter application unit (i.e., information regarding a resource to which the filter is applied), there are also the following examples similarly to the above-described case in which a filter application unit is semi-statically determined.

Notifying as part of RRC signaling (RRC Message)
Notifying as part of system information
Notifying as part of DCI In addition, the terminal apparatus may determine a filter application unit. In this case, the terminal apparatus may notify the base station of information representing the determined filter application unit, for example, as part of RRC signaling or uplink control information (UCI).

With the above-described configuration, the filter application unit can be more flexibly switched in accordance with a situation. In addition, even in a case in which the filter application unit has been switched, the terminal apparatus can recognize the switched application unit on the basis of a notification from the base station.

(5) Timing at which Filter Application Unit is Switched

Next, an example of a timing at which a filter application unit is switched will be described. For example, although the base station may perform switching of a filter application unit each time with respect to data to be transmitted, the base station may determine a timing at which switching is possible and switch the filter application unit on the basis of the determination result.

As a timing at which the base station switches the filter application unit, there are the following examples.

Switching based on feedback from the terminal apparatus on a communication quality
Switching at each predetermined timing (e.g., for one frame, etc.)
Switching at a retransmission timing That is, the base station may determine a timing at which a filter application unit is switched on the basis of the above-described conditions and switch the filter application unit at the timing based on the determination result.

In addition, as another example, the base station may notify the terminal apparatus that it is a timing at which the filter application unit can be switched on the basis of a determination result of the timing at which the filter application unit is switched. In addition, in a case in which the notification of the timing at which the filter application unit can be switched is received from the base station, the terminal apparatus determines whether switching of the filter application unit is necessary. Then, in a case in which the terminal apparatus determines switching of the filter application unit to be necessary, the terminal apparatus notifies the base station of a request for switching of the filter application unit. In this case, the base station may switch the filter application unit in accordance with the request from the terminal apparatus.

Note that, as timings at which the terminal apparatus requests switching of the filter application unit from the base station, there are the following examples.

Issuing a notification in a case in which a measurement result of a communication quality is a threshold value or lower
Issuing a notification in a case in which a decoding error occurs The example of a timing at which a filter application unit is switched has been described above. Note that an example of a flow of processes relating to switching of a filter application unit will be separately described below.

(6) Flow of Processes

Figure 13:
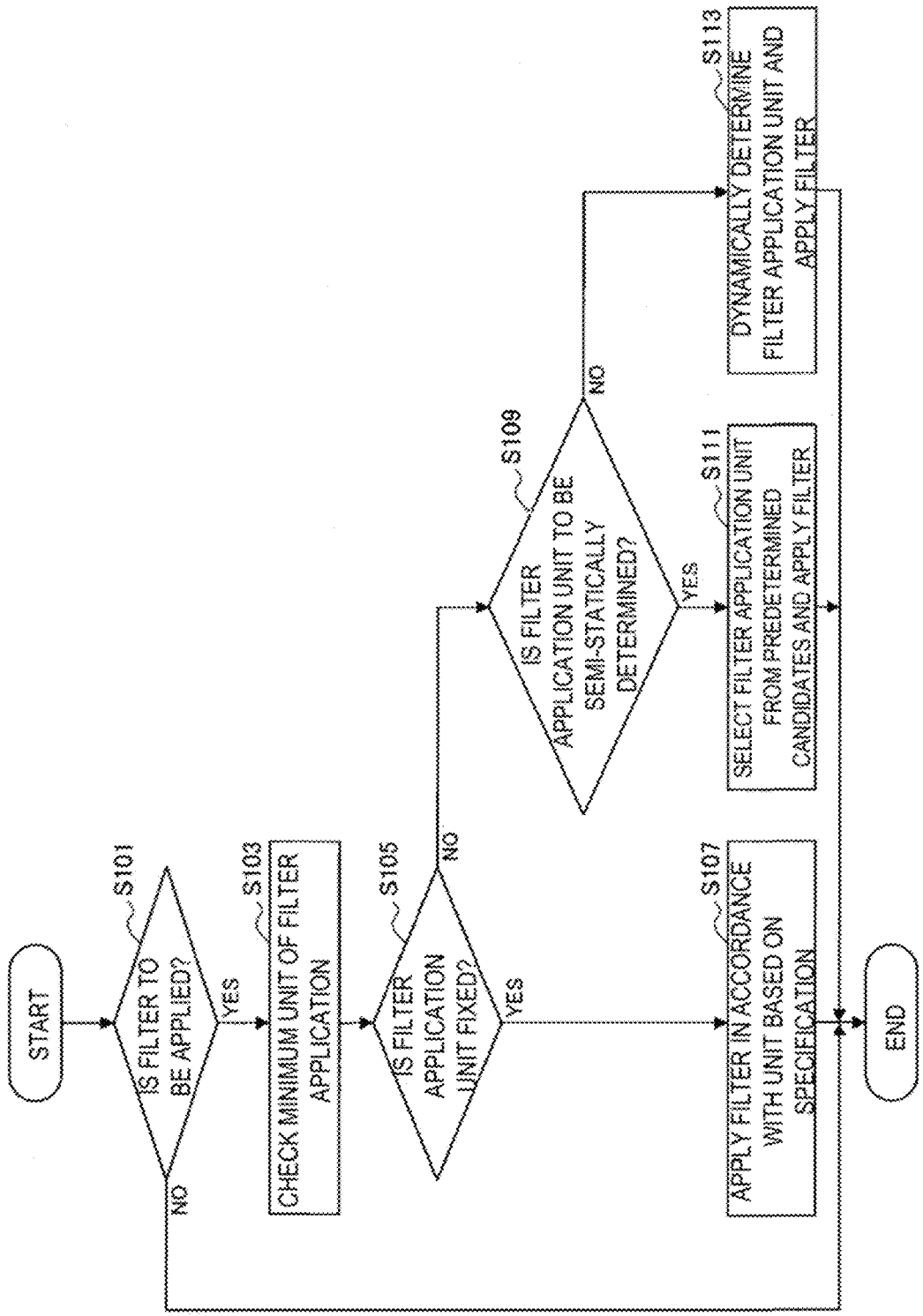
FIG. 13 is a flowchart illustrating an example of a flow of a series of processes relating to determination of a filter application unit.
Figure 14:
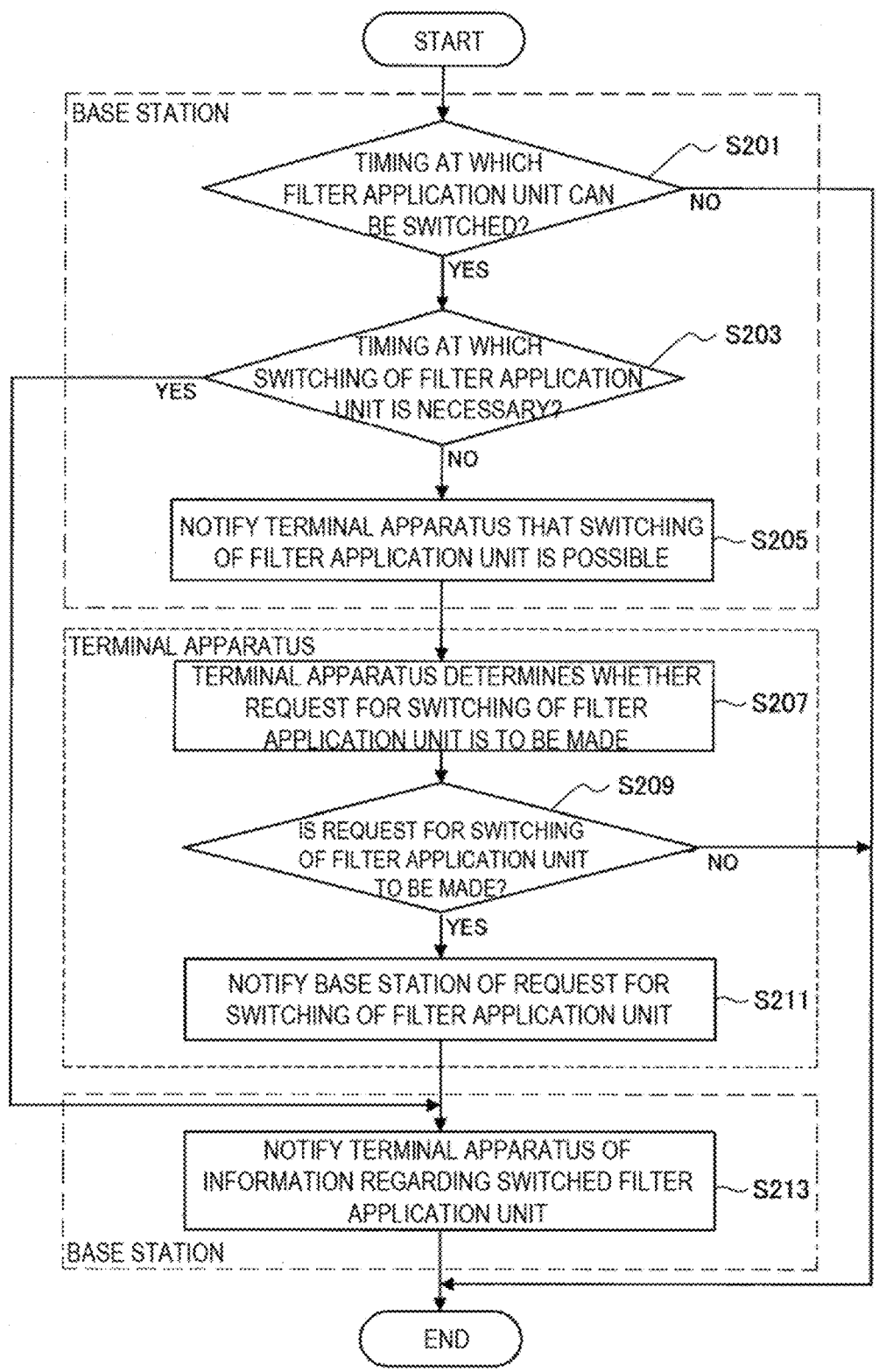
FIG. 14 is a flowchart illustrating an example of a flow of a series of processes relating to switching of a filter application unit.

Successively, examples of flows of processes of the system according to the present embodiment will be described with reference to FIG. 13 and FIG. 14.

(a) Processes Relating to Determination of Filter Application Unit

First, an example of a flow of a series of processes relating to determination of a filter application unit will be described with reference to FIG. 13. FIG. 13 is a flowchart illustrating the example of the flow of the series of processes relating to determination of a filter application unit. Note that, in the present description, the base station 100 will be assumed to determine a filter application unit.

First, the base station 100 (the communication processing unit 151) determines whether a filter for further limiting a frequency band width to be used as a guard band is to be applied to a transmission signal (S101). In a case in which it is determined that a filter is not to be applied (NO in S101), the base station 100 ends the series of processes relating to determination of a filter application unit.

In addition, in a case in which it is determined that a filter is to be applied (YES in S101), the base station 100 (the communication processing unit 151) checks a minimum unit to which a filter is applied (S103). Note that a minimum unit to which a filter is applied is as described above.

Next, the base station 100 (the communication processing unit 151) determines a filter application unit. Specifically, in a case in which a filter application unit is fixed (YES in S105), the base station 100 applies a filter to the transmission signal in each unit in accordance with the application unit on the basis of the application unit based on a specification (communication protocol) (S107).

In addition, in a case in which a filter application unit is semi-statically determined (NO in S105 and YES in S109), the base station 100 (the communication processing unit 151) selects a filter application unit from predetermined candidates on the basis of a predetermined condition. Then, the base station 100 applies a filter to the transmission signal in each unit in accordance with the selected filter application unit.

In addition, in a case in which a filter application unit is dynamically determined (NO in S109), the base station 100 (the communication processing unit 151) dynamically determines a filter application unit on the basis of a predetermined condition. Then, the base station 100 applies a filter to the transmission signal in each unit in accordance with the determined filter application unit.

The example of the flow of the series of processes relating to the determination of the filter application unit has been described above with reference to FIG. 13.

(b) Process Relating to Switching of Filter Application Unit

Next, an example of a flow of a series of processes relating to switching of a filter application unit will be described with reference to FIG. 14. FIG. 14 is a flowchart illustrating the example of the flow of the series of processes relating to switching of a filter application unit. Note that, in the present description, the base station 100 will be assumed to switch a filter application unit. That is, the main agent of the processes indicated by reference numerals S201 to S205 and S213 in the drawing is the base station 100, and the main agent of the processes indicated by reference numerals S207 to S211 is the terminal apparatus 200.

First, the base station 100 (the communication processing unit 151) checks whether it is a timing at which a filter application unit can be switched (S201). In a case in which it is not a timing at which a filter application unit can be switched (NO in S201), the series of processes ends without performing switching of a filter application unit.

In addition, in a case in which it is a timing at which a filter application unit can be switched (YES in S201), the base station 100 (the communication processing unit 151) checks whether it is a timing at which the switching of a filter application unit is necessary (S203). In a case in which it is a timing at which switching of a filter application unit is necessary (YES in S203), the base station 100 (the communication processing unit 151) determines a filter application unit on the basis of a predetermined condition. Then, the base station 100 (the notification unit 153) notifies the terminal apparatus 200 of information relating to the determined filter application unit (S213).

On the other hand, in a case in which it is determined that it is not a timing at which switching of a filter application unit is necessary (NO in S203), the base station 100 (the notification unit 153) notifies the terminal apparatus 200 that the switching of a filter application unit is possible (S205). Upon receiving the notification, the terminal apparatus 200 (the communication processing unit 243) determines whether a request for switching of a filter application unit is to be made with respect to the base station 100 on the basis of a predetermined condition (S207). Note that, in a case in which the terminal apparatus 200 determines not to make a request for switching of a filter application unit (NO in S209), the series of processes ends without performing switching of a filter application unit.

In addition, in a case in which it is determined to make a request for switching of a filter application unit (YES in S209), the terminal apparatus 200 (the notification unit 245) notifies the base station 100 of the request for switching of a filter application unit. Upon receiving the notification, the base station 100 (the communication processing unit 151) determines a filter application unit on the basis of the predetermined condition. Then, the base station 100 (the notification unit 153) notifies the terminal apparatus 200 of the information regarding the determined filter application unit (S213).

In addition, the terminal apparatus 200 (the information acquisition unit 241) receives the notification of the information regarding the filter application unit from the base station 100. Accordingly, the terminal apparatus 200 (the communication processing unit 243) can recognize the filter application unit to be applied to a signal transmitted from the base station 100, and thus can correctly decode the signal transmitted from the base station 100. In addition, the terminal apparatus 200 (the information acquisition unit 241) may apply the filter to a signal to be transmitted to the base station 100 in an application unit in accordance with the information notified from the base station 100. Accordingly, the base station 100 can correctly decode the signal transmitted from the terminal apparatus 200.

The example of the flow of the series of processes relating to the switching of the filter application unit has been described above with reference to FIG. 14.

4. APPLICATION EXAMPLES

The technology according to the present disclosure is applicable to a variety of products. For example, the base station 100 may be implemented as any type of evolved node B (eNB) such as a macro eNB or a small eNB. A small eNB may be an eNB that covers a smaller cell than a macro cell, such as a pico eNB, a micro eNB, or a home (femto) eNB. Alternatively, the base station 100 may be implemented as another type of base station such as a node B or a base transceiver station (BTS). The base station 100 may include a main body (which is also referred to as base station apparatus) that controls radio communication, and one or more remote radio heads (RRHs) disposed in a different place from that of the main body. In addition, various types of terminals described below may operate as the base station 100 by temporarily or semi-permanently executing the base station function. Moreover, at least some of components of the base station 100 may be implemented in a base station apparatus or a module for the base station apparatus.

In addition, the terminal apparatus 200 may be implemented as, for example, a mobile terminal such as a smartphone, a tablet personal computer (PC), a notebook PC, a portable game terminal, a portable/dongle type mobile router or a digital camera, or an onboard terminal such as a car navigation apparatus. In addition, the terminal apparatus 200 may be implemented as a terminal (which is also referred to as machine type communication (MTC) terminal) that performs machine-to-machine (M2M) communication. Further, at least some components of the terminal apparatus 200 may be implemented in modules (e.g., integrated circuit modules each including one die) mounted on these terminals.

<4.1. Application Example Regarding Base Station>
(First Application Example)

Figure 15:
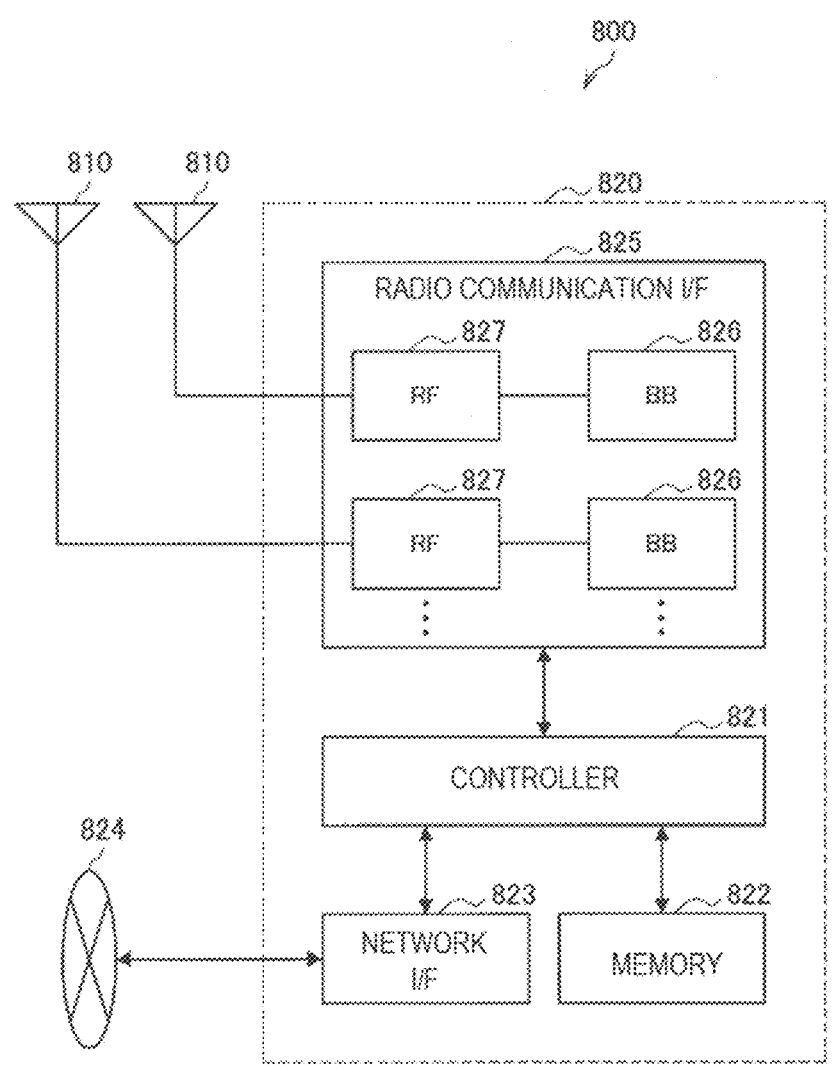
FIG. 15 is a block diagram illustrating a first example of a schematic configuration of an eNB.

FIG. 15 is a block diagram illustrating a first example of the schematic configuration of an eNB to which the technology according to the present disclosure can be applied. An eNB 800 includes one or more antennas 810 and a base station apparatus 820. Each antenna 810 can be connected to the base station apparatus 820 via an RF cable.

Each of the antennas 810 includes one or more antenna elements (e.g., a plurality of antenna elements included in an MIMO antenna), and is used for the base station apparatus 820 to transmit and receive radio signals. The eNB 800 includes the plurality of antennas 810 as illustrated in FIG. 15. For example, the plurality of antennas 810 may be compatible with a plurality of respective frequency bands used by the eNB 800. Note that FIG. 15 illustrates the example in which the eNB 800 includes the plurality of antennas 810, but the eNB 800 may also include the one antenna 810.

The base station apparatus 820 includes a controller 821, a memory 822, a network interface 823, and a radio communication interface 825.

The controller 821 may be, for example, a CPU or a DSP, and operates the various functions of a higher layer of the base station apparatus 820. For example, the controller 821 generates a data packet from data in signals processed by the radio communication interface 825, and transfers the generated packet via the network interface 823. The controller 821 may bundle data from a plurality of base band processors to generate the bundled packet, and transfer the generated bundled packet. In addition, the controller 821 may have logical functions of performing control such as radio resource control, radio bearer control, mobility management, admission control, or scheduling. In addition, the control may be executed in corporation with an eNB or a core network node in the vicinity. The memory 822 includes a RAM and a ROM, and stores a program that is executed by the controller 821, and various kinds of control data (e.g., terminal list, transmission power data, scheduling data, and the like).

The network interface 823 is a communication interface for connecting the base station apparatus 820 to a core network 824. The controller 821 may communicate with a core network node or another eNB via the network interface 823. In that case, the eNB 800 may be connected to a core network node or another eNB through a logical interface (e.g., S1 interface or X2 interface). The network interface 823 may also be a wired communication interface or a radio communication interface for radio backhaul. In the case where the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) or LTE-Advanced, and provides radio connection to a terminal positioned in a cell of the eNB 800 via the antenna 810. The radio communication interface 825 can typically include a baseband (BB) processor 826, an RF circuit 827, and the like. The BB processor 826 may perform, for example, encoding/decoding, modulating/demodulating, multiplexing/demultiplexing and the like, and executes various kinds of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. In addition, the above-described module may be a card or a blade that is inserted into a slot of the base station apparatus 820. Alternatively, the above-described module may also be a chip that is mounted on the above-described card or the above-described blade. Meanwhile, the RF circuit 827 may include a mixer, a filter, an amplifier and the like, and transmits and receives radio signals via the antenna 810.

The radio communication interface 825 includes the plurality of BB processors 826, as illustrated in FIG. 15. For example, the plurality of BB processors 826 may be compatible with each of a plurality of frequency bands used by the eNB 800. In addition, the radio communication interface 825 includes the plurality of RF circuits 827, as illustrated in FIG. 15. For example, the plurality of RF circuits 827 may be compatible with respective antenna elements. Note that FIG. 15 illustrates the example in which the radio communication interface 825 includes the plurality of BB processors 826 and the plurality of RF circuits 827, but the radio communication interface 825 may also include the one BB processor 826 or the one RF circuit 827.

In the eNB 800 illustrated in FIG. 15, one or more components (the transmission processing unit 151 and/or the notification unit 153) included in the processing unit 150 described with reference to FIG. 4 may be implemented in the radio communication interface 825. Alternatively, at least some of these components may be implemented in the controller 821. As an example, a module that includes a part (e.g., BB processor 826) or the whole of the radio communication interface 825 and/or the controller 821 may be mounted in the eNB 800, and the above-described one or more components may be implemented in the module. In this case, the above-described module may store a program for causing the processor to function as the above-described one or more components (i.e., program for causing the processor to execute the operations of the above-described one or more components) and may execute the program. As another example, the program for causing the processor to function as the above-described one or more components may be installed in the eNB 800, and the radio communication interface 825 (e.g., BB processor 826) and/or the controller 821 may execute the program. As described above, the eNB 800, the base station apparatus 820, or the above-described module may be provided as an apparatus that includes the above-described one or more components, and the program for causing the processor to function as the above-described one or more components may be provided. In addition, a readable recording medium having the above-described program recorded thereon may be provided.

In addition, in an eNB 830 illustrated in FIG. 15, the radio communication unit 120 described with reference to FIG. 4 may be implemented in the radio communication interface 825 (e.g., RF circuit 827). In addition, the antenna unit 110 may be implemented in the antenna 810. In addition, the network communication unit 130 may be implemented in the controller 821 and/or the network interface 823. In addition, the storage unit 140 may be implemented in the memory 822.

(Second Application Example)

Figure 16:
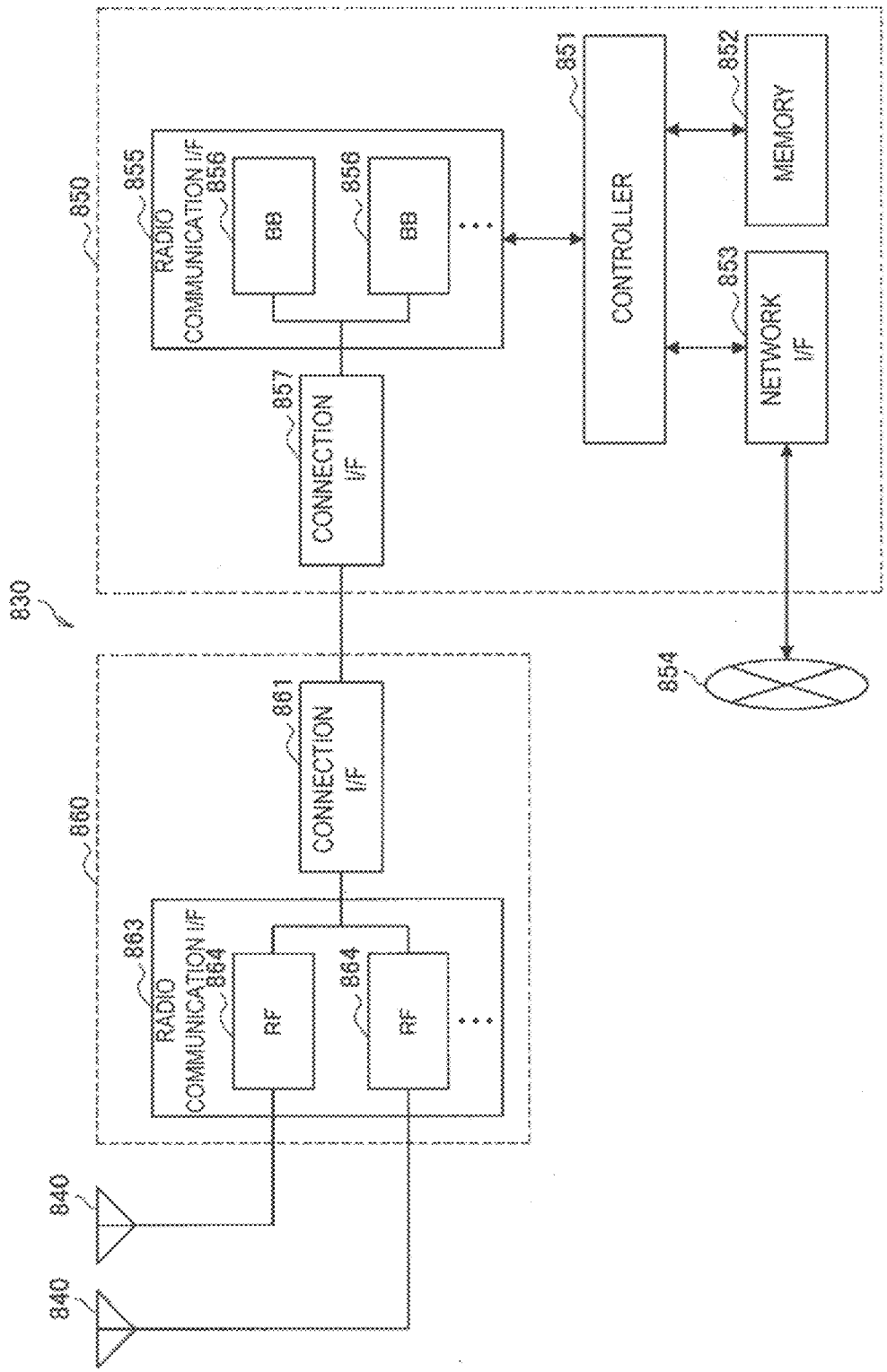
FIG. 16 is a block diagram illustrating a second example of the schematic configuration of the eNB.

FIG. 16 is a block diagram illustrating a second example of a schematic configuration of an eNB to which the technology according to the present disclosure can be applied. The eNB 830 includes one or more antennas 840, a base station apparatus 850, and an RRH 860. Each antenna 840 may be connected to the RRH 860 via an RF cable. In addition, the base station apparatus 850 can be connected to the RRH 860 via a high speed line such as an optical fiber cable.

Each of the antennas 840 includes one or more antenna elements (e.g., a plurality of antenna elements included in an MIMO antenna), and is used for the RRH 860 to transmit and receive radio signals. The eNB 830 includes the plurality of antennas 840 as illustrated in FIG. 16. For example, the plurality of antennas 840 may be compatible with a plurality of respective frequency bands used by the eNB 830. Note that FIG. 16 illustrates the example in which the eNB 830 includes the plurality of antennas 840, but the eNB 830 may include the one antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 15.

The radio communication interface 855 supports any cellular communication scheme such as LTE or LTE-Advanced, and provides radio communication to a terminal positioned in the sector corresponding to the RRH 860 via the RRH 860 and the antenna 840. The radio communication interface 855 can typically include a BB processor 856 and the like. The BB processor 856 is similar to the BB processor 826 described with reference to FIG. 15, except that the BB processor 856 is connected to the RF circuit 864 of the RRH 860 via the connection interface 857. The radio communication interface 855 includes the plurality of BB processors 856 as illustrated in FIG. 16. For example, the plurality of BB processors 856 may be compatible with a plurality of respective frequency bands used by the eNB 830. Note that FIG. 16 illustrates the example in which the radio communication interface 855 includes the plurality of BB processors 856, but the radio communication interface 855 may include the one BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include the RF circuit 864 and the like. The RF circuit 864 may include a mixer, a filter, an amplifier and the like, and transmits and receives radio signals via the antenna 840. The radio communication interface 863 includes the plurality of RF circuits 864 as illustrated in FIG. 16. For example, the plurality of RF circuits 864 may be compatible with a plurality of respective antenna elements. Note that FIG. 16 illustrates the example in which the radio communication interface 863 includes the plurality of RF circuits 864, but the radio communication interface 863 may include the one RF circuit 864.

In the eNB 830 illustrated in FIG. 16, one or more components (the transmission processing unit 151 and/or the notification unit 153) included in the processing unit 150 described with reference to FIG. 4 may be implemented in the radio communication interface 855 and/or the radio communication interface 863. Alternatively, at least some of these components may be implemented in the controller 851. As an example, a module that includes a part (e.g., BB processor 856) or the whole of the radio communication interface 855 and/or the controller 821 may be mounted in eNB 830, and the above-described one or more components may be implemented in the module. In this case, the above-described module may store a program for causing the processor to function as the above-described one or more components (i.e., a program for causing the processor to execute the operations of the above-described one or more components) and may execute the program. As another example, the program for causing the processor to function as the above-described one or more components may be installed in the eNB 830, and the radio communication interface 855 (e.g., BB processor 856) and/or the controller 851 may execute the program. As described above, the eNB 830, the base station apparatus 850, or the above-described module may be provided as an apparatus that includes the above-described one or more components, and the program for causing the processor to function as the above-described one or more components may be provided. In addition, a readable recording medium having the above-described program recorded thereon may be provided.

In addition, in the eNB 830 illustrated in FIG. 16, the radio communication unit 120 described, for example, with reference to FIG. 4 may be implemented in the radio communication interface 863 (e.g., RF circuit 864). In addition, the antenna unit 110 may be implemented in the antenna 840. In addition, the network communication unit 130 may be implemented in the controller 851 and/or the network interface 853. In addition, the storage unit 140 may be implemented in the memory 852.

<4.2. Application Example Regarding Terminal Apparatus>

(First Application Example)

Figure 17:
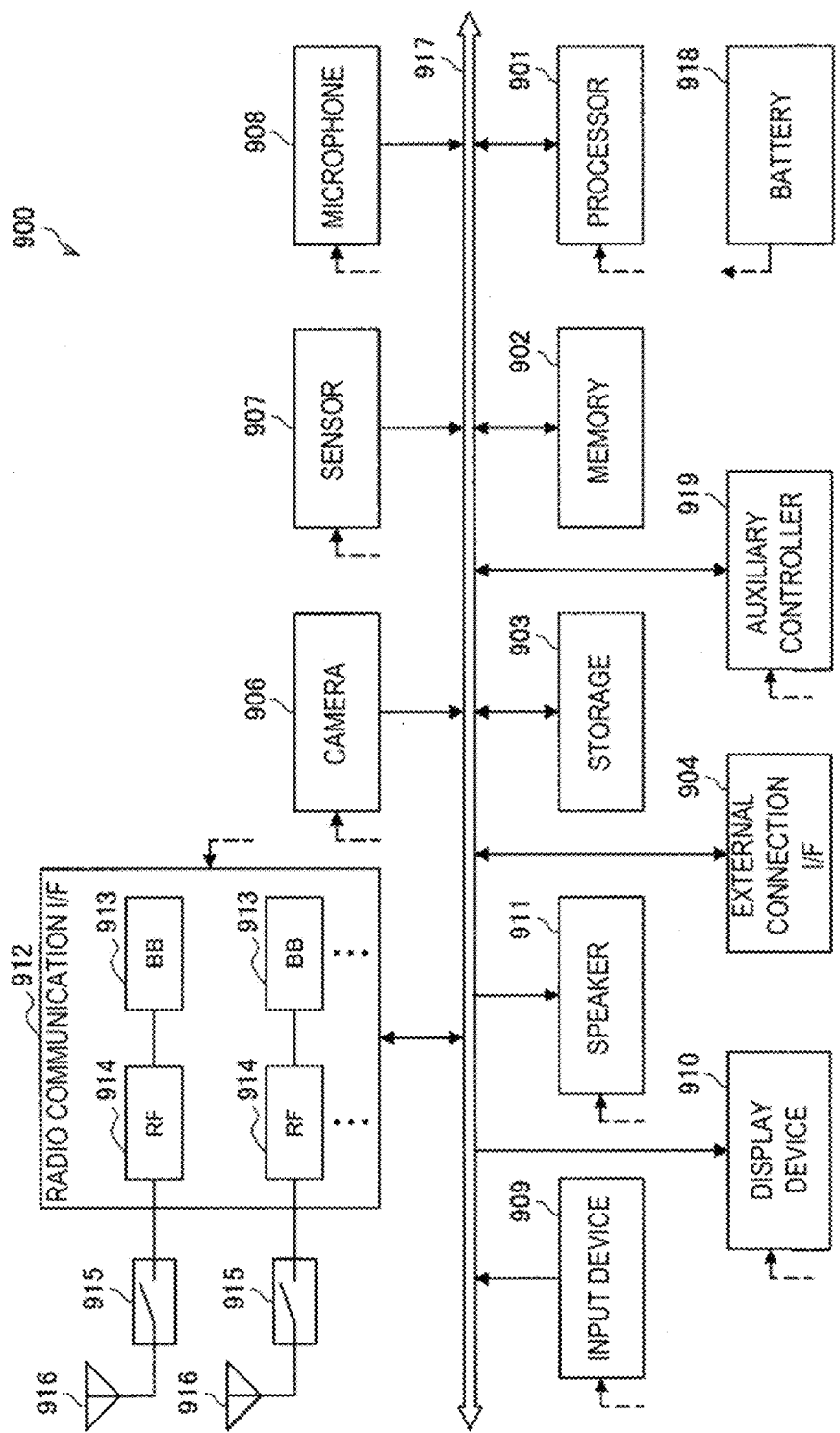
FIG. 17 is a block diagram illustrating an example of a schematic configuration of a smartphone.

FIG. 17 is a block diagram illustrating an example of the schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of the application layer and another layer of the smartphone 900. The memory 902 includes a RAM and a ROM, and stores a program that is executed by the processor 901, and data. The storage 903 can include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge coupled device (CCD) or a complementary metal oxide semiconductor (CMOS), and generates a captured image. The sensor 907 can include, for example, a group of sensors such as a measurement sensor, a gyro sensor, a geomagnetic sensor, and an acceleration sensor. The microphone 908 converts sound input to the smartphone 900 to sound signals. The input device 909 includes, for example, a touch sensor configured to detect touch onto a screen of the display device 910, a keypad, a keyboard, a button, a switch or the like, and receives an operation or an information input from a user. The display device 910 includes a screen such as a liquid crystal display (LCD) or an organic light-emitting diode (OLED) display, and displays an output image of the smartphone 900. The speaker 911 converts sound signals output from the smartphone 900 to sound.

The radio communication interface 912 supports any cellular communication scheme such as LTE and LTE-Advanced, and executes radio communication. The radio communication interface 912 may typically include a BB processor 913, an RF circuit 914, and the like. The BB processor 913 may perform, for example, encoding/decoding, modulating/demodulating, multiplexing/demultiplexing and the like, and executes various kinds of signal processing for radio communication. Meanwhile, the RF circuit 914 may include a mixer, a filter, an amplifier and the like, and transmits and receives radio signals via the antenna 916. The radio communication interface 912 may also be a one chip module that has the BB processor 913 and the RF circuit 914 integrated thereon. The radio communication interface 912 may include the plurality of BB processors 913 and the plurality of RF circuits 914 as illustrated in FIG. 17. Note that FIG. 17 illustrates the example in which the radio communication interface 912 includes the plurality of BB processors 913 and the plurality of RF circuits 914, but the radio communication interface 912 may also include the one BB processor 913 or the one RF circuit 914.

Further, in addition to a cellular communication scheme, the radio communication interface 912 may support another type of radio communication scheme such as a short-distance radio communication scheme, a near field communication scheme, or a radio local area network (LAN) scheme. In that case, the radio communication interface 912 may include the BB processor 913 and the RF circuit 914 for each radio communication scheme.

Each of the antenna switches 915 switches a connection destination of the antenna 916 between a plurality of circuits (e.g., circuits for different radio communication schemes) included in the radio communication interface 912.

Each of the antennas 916 includes one or more antenna elements (e.g., a plurality of antenna elements included in an MIMO antenna), and is used for the radio communication interface 912 to transmit and receive radio signals. The smartphone 900 may include the plurality of antennas 916 as illustrated in FIG. 17. Note that FIG. 17 illustrates the example in which the smartphone 900 includes the plurality of antennas 916, but the smartphone 900 may include the one antenna 916.

Further, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to the respective blocks of the smartphone 900 illustrated in FIG. 17 via feeder lines that are partially illustrated as dashed lines in the figure. The auxiliary controller 919 operates a minimum necessary function of the smartphone 900, for example, in a sleep mode.

In the smartphone 900 illustrated in FIG. 17, one or more components (the information acquisition unit 241, the communication processing unit 243 and/or the notification unit 245) included in the processing unit 240 described with reference to FIG. 5 may be implemented in the radio communication interface 912. Alternatively, at least some of these components may be implemented in the processor 901 or the auxiliary controller 919. As an example, a module that includes a part (e.g., BB processor 913) or the whole of the radio communication interface 912, the processor 901 and/or the auxiliary controller 919 may be mounted in the smartphone 900, and the above-described one or more components may be implemented in the module. In this case, the above-described module may store a program for causing the processor to function as the above-described one or more components (i.e., a program for causing the processor to execute the operations of the above-described one or more components) and may execute the program. As another example, the program for causing the processor to function as the above-described one or more components may be installed in the smartphone 900, and the radio communication interface 912 (e.g., BB processor 913), the processor 901 and/or the auxiliary controller 919 may execute the program. As described above, the smartphone 900 or the above-described module may be provided as an apparatus that includes the above-described one or more components, and the program for causing the processor to function as the above-described one or more components may be provided. In addition, a readable recording medium having the above-described program recorded thereon may be provided.

In addition, in the smartphone 900 illustrated in FIG. 17, the radio communication unit 220 described, for example, with reference to FIG. 5 may be implemented in the radio communication interface 912 (e.g., RF circuit 914). In addition, the antenna unit 210 may be implemented in the antenna 916. In addition, the storage unit 230 may be implemented in the memory 902.

(Second Application Example)

Figure 18:
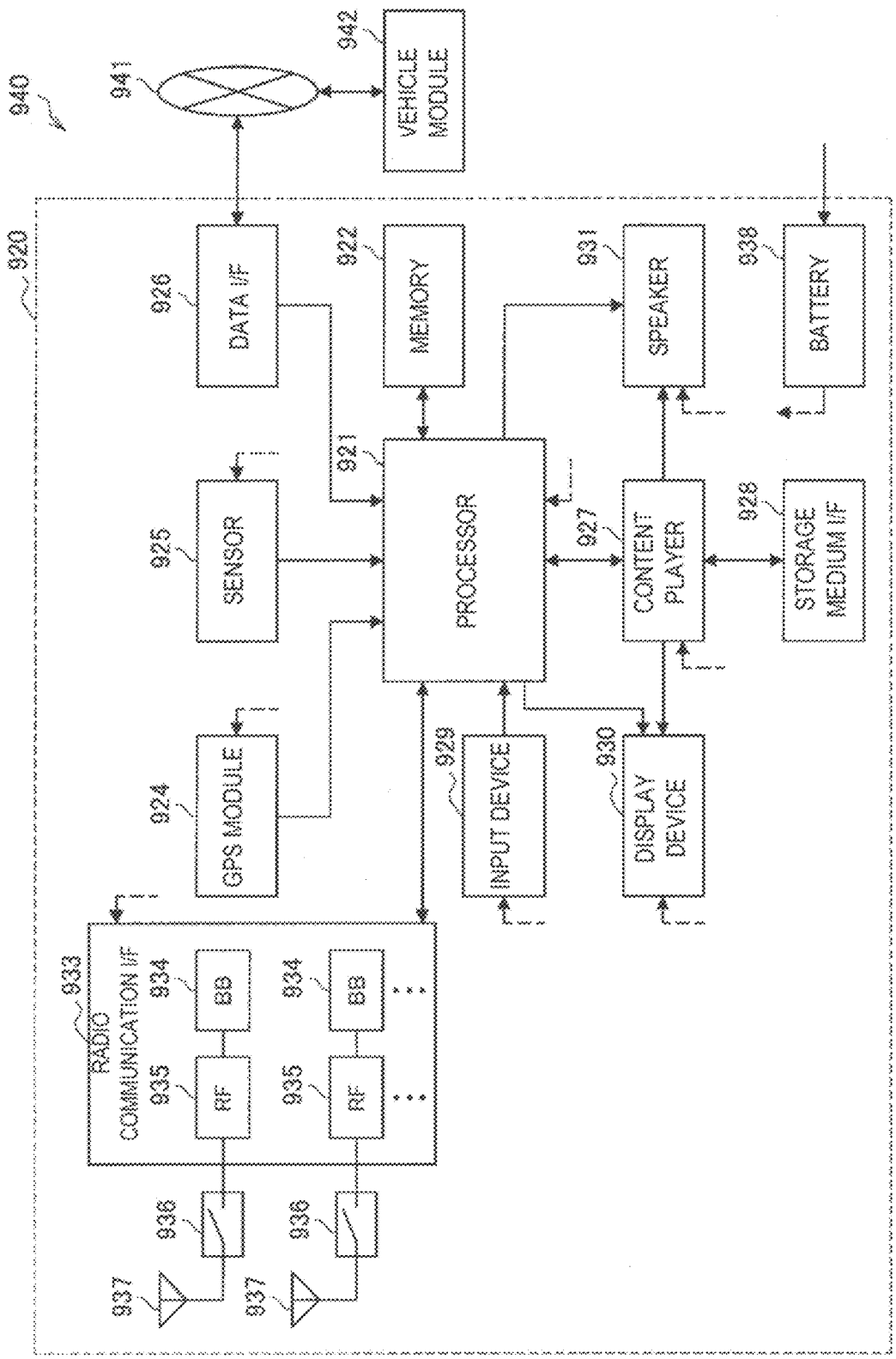
FIG. 18 is a block diagram illustrating an example of a schematic configuration of a car navigation apparatus.

FIG. 18 is a block diagram illustrating an example of the schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls the navigation function and another function of the car navigation apparatus 920. The memory 922 includes a RAM and a ROM, and stores a program that is executed by the processor 921, and data.

The GPS module 924 uses GPS signals received from a GPS satellite to measure the position (e.g., latitude, longitude, and altitude) of the car navigation apparatus 920. The sensor 925 may include, for example, a group of sensors such as a gyro sensor, a geomagnetic sensor, and a barometric sensor. The data interface 926 is connected to, for example, an in-vehicle network 941 via a terminal that is not illustrated, and acquires data such as vehicle speed data generated by the vehicle side.

The content player 927 reproduces content stored in a storage medium (e.g., CD or DVD) that is inserted into the storage medium interface 928. The input device 929 includes, for example, a touch sensor configured to detect touch onto a screen of the display device 930, a button, a switch or the like and receives an operation or an information input from a user. The display device 930 includes a screen such as an LCD or an OLED display, and displays an image of the navigation function or content that is reproduced. The speaker 931 outputs the sound of the navigation function or the content that is reproduced.

The radio communication interface 933 supports any cellular communication scheme such as LTE and LTE-Advanced, and executes radio communication. The radio communication interface 933 may typically include a BB processor 934, an RF circuit 935, and the like. The BB processor 934 may perform, for example, encoding/decoding, modulating/demodulating, multiplexing/demultiplexing and the like, and executes various kinds of signal processing for radio communication. Meanwhile, the RF circuit 935 may include a mixer, a filter, an amplifier and the like, and transmits and receives radio signals via the antenna 937. The radio communication interface 933 may also be a one chip module that has the BB processor 934 and the RF circuit 935 integrated thereon. The radio communication interface 933 may include the plurality of BB processors 934 and the plurality of RF circuits 935 as illustrated in FIG. 18. Note that FIG. 18 illustrates the example in which the radio communication interface 933 includes the plurality of BB processors 934 and the plurality of RF circuits 935, but the radio communication interface 933 may also include the one BB processor 934 or the one RF circuit 935.

Further, in addition to a cellular communication scheme, the radio communication interface 933 may support another type of radio communication scheme such as a short-distance radio communication scheme, a near field communication scheme, or a radio LAN scheme. In that case, the radio communication interface 933 may include the BB processor 934 and the RF circuit 935 for each radio communication scheme.

Each of the antenna switches 936 switches a connection destination of the antenna 937 between a plurality of circuits (e.g., circuits for different radio communication schemes) included in the radio communication interface 933.

Each of the antennas 937 includes one or more antenna elements (e.g., a plurality of antenna elements included in an MIMO antenna), and is used for the radio communication interface 933 to transmit and receive radio signals. The car navigation apparatus 920 may include the plurality of antennas 937 as illustrated in FIG. 18. Note that FIG. 18 illustrates an example in which the car navigation apparatus 920 includes the plurality of antennas 937, but the car navigation apparatus 920 may include the one antenna 937.

Further, the car navigation apparatus 920 may include the antenna 937 for each radio communication scheme. In that case, the antenna switches 936 may be omitted from the configuration of the car navigation apparatus 920.

The battery 938 supplies power to the respective blocks of the car navigation apparatus 920 illustrated in FIG. 18 via feeder lines that are partially illustrated as dashed lines in the figure. In addition, the battery 938 accumulates power supplied from the vehicle side.

In the car navigation apparatus 920 illustrated in FIG. 18, one or more components (the information acquisition unit 241, the communication processing unit 243, and/or the notification unit 245) included in the processing unit 240 described with reference to FIG. 5 may be implemented in the radio communication interface 933. Alternatively, at least some of these components may be implemented in the processor 921. As an example, a module that includes a part (e.g., BB processor 934) or the whole of the radio communication interface 933 and/or the processor 921 may be mounted in the car navigation apparatus 920, and the above-described one or more components may be implemented in the module. In this case, the above-described module may store a program for causing the processor to function as the above-described one or more components (i.e., a program for causing the processor to execute the operations of the above-described one or more components) and may execute the program. As another example, the program for causing the processor to function as the above-described one or more components may be installed in the car navigation apparatus 920, and the radio communication interface 933 (e.g., BB processor 934) and/or the processor 921 may execute the program. As described above, the car navigation apparatus 920 or the above-described module may be provided as an apparatus that includes the above-described one or more components, and the program for causing the processor to function as the above-described one or more components may be provided. In addition, a readable recording medium having the above-described program recorded thereon may be provided.

In addition, in the car navigation apparatus 920 illustrated in FIG. 18, the radio communication unit 220 described, for example, with reference to FIG. 5 may be implemented in the radio communication interface 933 (e.g., RF circuit 935). In addition, the antenna unit 210 may be implemented in the antenna 937. In addition, the storage unit 230 may be implemented in the memory 922.

In addition, the technology according to the present disclosure may also be implemented as an in-vehicle system (or a vehicle) 940 including one or more blocks of the above-described car navigation apparatus 920, the in-vehicle network 941, and a vehicle module 942. That is, the in-vehicle system (or the vehicle) 940 may be provided as an apparatus that includes the information acquisition unit 241, the communication processing unit 243, and/or the notification unit 245. The vehicle module 942 generates vehicle-side data such as vehicle speed, engine speed, or trouble information, and outputs the generated data to the in-vehicle network 941.

5. CONCLUSION

The embodiment of the present disclosure has been described in detail above with reference to FIG. 1 to FIG. 18.

As described above, the base station 100 according to the embodiment notifies the terminal apparatus 200 of control information regarding a resource to which a filter for limiting a width of a guard band in a frequency band to be used in radio communication is applied. More specifically, a filter application unit is determined with a resource element as a minimum unit. Then, the base station 100 notifies the terminal apparatus 200 of, for example, information regarding the determined filter application unit.

In addition, in a case in which each of the base station 100 and the terminal apparatus 200 operates as a transmission apparatus, the transmission apparatus applies a filter for limiting a width of a guard band to transmission data (i.e., a transmission signal) on the basis of control information regarding a resource to which the filter is applied. Then, the transmission apparatus transmits the filter-applied transmission data to an external apparatus serving as a transmission destination.

According to the system of the embodiment, a resource (i.e., filter application unit) to which a filter for limiting a width of a guard band is applied can be adaptively selected or determined in accordance with a transmission/reception environment or a use case with the above-described configuration. Accordingly, the filter can be applied to the transmission data in a more preferable mode, and improvement in throughput of the whole system is expected.

The preferred embodiment (s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An apparatus including:
a communication unit configured to perform radio communication; and
a control unit configured to perform control such that control information regarding a resource to which a filter for limiting a width of a guard band in a frequency band to be used in the radio communication is applied is transmitted to an external apparatus through the radio communication.

(2)
The apparatus according to (1), in which the control unit determines a unit to which the filter is applied with the resource as a minimum unit and performs control such that information regarding the unit is transmitted to the external apparatus through the radio communication as the control information regarding the resource.

(3)
The apparatus according to (2), in which the unit is determined on a basis of a number of resources in at least one of a frequency direction and a time direction.

(4)
The apparatus according to any one of (1) to (3), including:
a storage unit configured to store the control information,
in which the control unit performs control such that the control information stored in the storage unit is transmitted to the external apparatus through the radio communication.

(5)
The apparatus according to (1), in which the control unit determines a resource to which the filter is applied on a basis of a predetermined condition.

(6)
The apparatus according to (5), in which the control unit determines a resource to which the filter is applied from a plurality of preset candidates on the basis of the predetermined condition.

(7)
The apparatus according to (5) or (6), in which the control unit determines a resource to which the filter is applied after receiving a request for a resource to which the filter is applied from the external apparatus.

(8)
The apparatus according to any one of (5) to (7), in which the control unit determines a resource to which the filter is applied in accordance with at least one of feedback from the external apparatus on a communication quality, a retransmission request from the external apparatus, position information of the external apparatus, and a request for a communication quality from the external apparatus.

(9)
The apparatus according to any one of (1) to (8), in which the control unit performs control such that information regarding a timing at which a resource to which the filter is applied is switched is transmitted to the external apparatus through the radio communication.

(10)
The apparatus according to (2) or (3), in which the control unit determines the unit to which the filter is applied on a basis of a predetermined condition.

(11)
The apparatus according to (10), in which the control unit determines the unit to which the filter is applied from a plurality of preset candidates on the basis of the predetermined condition.

(12)
The apparatus according to (10) or (11), in which the control unit determines the unit to which the filter is applied after receiving a request for the unit to which the filter is applied from the external apparatus.

(13)
The apparatus according to any one of (10) to (12), in which the control unit determines the unit to which the filter is applied in accordance with at least one of feedback from the external apparatus on a communication quality, a retransmission request from the external apparatus, position information of the external apparatus, and a request for a communication quality from the external apparatus.

(14)
The apparatus according to any one of (2), 3, and 10 to (13), in which the control unit performs control such that information regarding a timing at which the unit to which the filter is applied is switched is transmitted to the external apparatus through the radio communication.

(15)
An apparatus including:
a communication unit configured to perform radio communication; and
an acquisition unit configured to acquire control information regarding a resource to which a filter for limiting a width of a guard band in a frequency band to be used in the radio communication is applied from an external apparatus through the radio communication.

(16)

The apparatus according to (15), including:
a control unit configured to perform control such that a request for switching of a resource to which the filter is applied is transmitted to the external apparatus through the radio communication in accordance with a predetermined condition.

(17)

The apparatus according to (16), in which the control unit performs control such that the request is transmitted to the external apparatus through the radio communication in accordance with a quality of the radio communication.

(18)

The apparatus according to (16), in which the control unit performs control such that the request is transmitted to the external apparatus through the radio communication in accordance with a decoding result of data received from the external apparatus through the radio communication.

(19)

An apparatus including:
a communication unit configured to perform radio communication; and
a control unit configured to perform control such that, on a basis of control information regarding a resource to which a filter for limiting a width of a guard band in a frequency band to be used in the radio communication is applied, the filter is applied to transmission data and the transmission data to which the filter has been applied is transmitted to an external apparatus through the radio communication.

(20)

A method including:
performing radio communication; and
performing control, by a processor, such that control information regarding a resource to which a filter for limiting a width of a guard band in a frequency band to be used in the radio communication is applied is transmitted to an external apparatus through the radio communication.

(21)

A method including:
performing radio communication; and
acquiring, by a processor, control information regarding a resource to which a filter for limiting a width of a guard band in a frequency band to be used in the radio communication is applied from an external apparatus through the radio communication.

(22)

A method including:
performing radio communication; and
performing control, by a processor, such that, on a basis of control information regarding a resource to which a filter for limiting a width of a guard band in a frequency band to be used in the radio communication is applied, the filter is applied to transmission data and the transmission data to which the filter has been applied is transmitted to an external apparatus through the radio communication.

REFERENCE SIGNS LIST 1 system
10 cell
100 base station
110 antenna unit
120 radio communication unit
130 network communication unit
140 storage unit
150 processing unit
151 communication processing unit
153 notification unit
200 terminal apparatus
210 antenna unit
220 radio communication unit
230 storage unit
240 processing unit
241 information acquisition unit
243 communication processing unit
245 notification unit

The invention claimed is:

1. An apparatus comprising:
circuitry configured to
perform radio communication;
transmit to an external apparatus through the radio communication control information regarding a resource to be used in the radio communication:
select a filter application unit from a plurality of candidates, wherein each of the plurality of candidates comprises a subcarrier bandwidth and a symbol length, and the filter application unit represents a minimum time-frequency unit to which a filter is applied;
divide a bit stream into a plurality of units, each of the plurality of units having a size of the selected filter application unit;
apply the filter to each of the plurality of units to generate a plurality of filtered units; and
add the plurality of filtered units to generate a signal for transmission,
wherein the control information is transmitted to the external apparatus, and the control information is used by the external apparatus to set the width of a guard band around the signal.

2. The apparatus according to claim 1, wherein the circuitry is further configured to perform control such that information regarding the filter application unit is transmitted to the external apparatus through the radio communication as the control information regarding the resource.

3. The apparatus according to claim 2, wherein the filter application unit is determined on a basis of a number of resources in at least one of a frequency direction and a time direction.

4. The apparatus according to claim 2, wherein the circuitry is further configured to determine the resource to filter on a basis of a predetermined condition.

5. The apparatus according to claim 4, wherein the circuitry is further configured to determine the resource from a plurality of preset candidates in accordance with at least one of feedback from the external apparatus on a communication quality, a retransmission request from the external apparatus, position information of the external apparatus, and a request for a communication quality from the external apparatus.

6. The apparatus according to claim 2, wherein the circuitry is further configured to perform control such that information is transmitted to the external apparatus through the radio communication regarding a timing at which the filter application unit is switched.

7. The apparatus according to claim 1, comprising:
a storage unit configured to store the control information, wherein the circuitry is further configured to perform control such that the control information stored in the storage unit is transmitted to the external apparatus through the radio communication.

8. The apparatus according to claim 1, wherein the circuitry is further configured to perform control such that information regarding a timing at which the resource which is filtered is switched is transmitted to the external apparatus through the radio communication.

9. The apparatus according to claim 1, wherein the circuitry is further configured to determine an application unit in accordance with at least one of feedback from the external apparatus on a communication quality, a retransmission request from the external apparatus, position information of the external apparatus, and a request for a communication quality from the external apparatus.

10. The apparatus according to claim 1, wherein the circuitry is further configured to select the filter application unit on the basis of a predetermined condition.

11. The apparatus according to claim 1, wherein the information comprises a request from the external apparatus to switch the filter to a different one of a plurality of filter candidates.

12. The apparatus according to claim 1, wherein the information comprises feedback from the external apparatus on a communication quality.

13. The apparatus according to claim 1, wherein the filter comprises at least one of a Dolph Chebyshev filter and a Nyquest filter.

14. The apparatus according to claim 1, wherein the control information is transmitted to the external apparatus as part of a Radio Resource Control (RRC) signaling.

15. An apparatus comprising:
circuitry configured to
perform radio communication;
acquire control information regarding a resource to be used in the radio communication from an external apparatus through the radio communication;
select a filter application unit from a plurality of candidates wherein each of the plurality of filter candidates comprises a subcarrier bandwidth and a symbol length, and the filter application unit represents a minimum time-frequency unit to which a filter is applied;
divide a bit stream into a plurality of units, each of the plurality of units having a size of the selected filter application unit;
apply the filter to each of the plurality of units to generate a plurality of filtered units; and
add the plurality of filtered units to generate a signal for transmission,
wherein the control information is acquired from the external apparatus, and the control information is used by the apparatus to set the width of a guard band around the signal.

16. The apparatus according to claim 15, wherein the circuitry is further configured to:
perform control such that a request for switching of the resource which is limited is transmitted to the external apparatus through the radio communication in accordance with a predetermined condition.

17. The apparatus according to claim 16, wherein the circuitry is further configured to perform control such that the request is transmitted to the external apparatus through the radio communication in accordance with a quality of the radio communication.

18. The apparatus according to claim 16, wherein the circuitry is further configured to perform control such that the request is transmitted to the external apparatus through the radio communication in accordance with a decoding result of data received from the external apparatus through the radio communication.

19. An apparatus comprising:
circuitry configured to
perform radio communication;
perform control such that, on a basis of control information regarding a resource to which a filter is applied for limiting a width of a guard band in a frequency band to be used in the radio communication, the filter is applied to transmission data and the transmission data to which the filter has been applied is transmitted to an external apparatus through the radio communication;
divide the transmission data into a plurality of units;
apply the filter to each of the plurality of units to generate a plurality of filtered units; and
add the plurality of filtered units to generate a signal for transmission,
wherein the filter comprises a filter application unit representing a minimum time-frequency unit to which the filter is applied,
wherein the control information is received from the external apparatus, and the control information is used by the apparatus to set the width of the guard band around the signal,
wherein the filter application unit is selected by the external apparatus from a plurality of candidates based on information received from the apparatus, and
wherein the plurality of candidates are stored in a memory and each of the plurality of candidates comprises a subcarrier bandwidth and a symbol length.

20. A method comprising:
performing radio communication;
acquiring, by a processor, control information regarding a resource to be used in the radio communication from an external apparatus through the radio communication;
selecting a filter application unit from a plurality of candidates, wherein each of the plurality of candidates comprises a subcarrier bandwidth and a symbol length, and the filter application unit represents a minimum time-frequency unit to which a filter is applied;
dividing a bit stream into a plurality of units, each of the plurality of units having a size of the selected filter application unit;
applying the filter to each of the plurality of units to generate a plurality of filtered units; and
adding the plurality of filtered units to generate a signal for transmission,
wherein the control information is transmitted to the external apparatus as part of a Radio Resource Control (RRC) signaling, and the control information is used by the external apparatus to set the width of a guard band around the signal.

* * * * *